US011542350B2

(12) United States Patent
Keaton et al.

(10) Patent No.: US 11,542,350 B2
(45) Date of Patent: Jan. 3, 2023

(54) BINUCLEAR OLEFIN POLYMERIZATION ACTIVATORS

(71) Applicant: Dow Global Technologies LLC, Midland, MI (US)

(72) Inventors: Richard J. Keaton, Lake Jackson, TX (US); Rafael Huacuja, Lake Jackson, TX (US); David R. Wilson, Midland, MI (US); Jerzy Klosin, Midland, MI (US); David M. Pearson, Lake Jackson, TX (US); Todd D. Senecal, Midland, MI (US); Sukrit Mukhopadhyay, Midland, MI (US); William H. H. Woodward, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 239 days.

(21) Appl. No.: 17/043,154

(22) PCT Filed: Mar. 22, 2019

(86) PCT No.: PCT/US2019/023643
§ 371 (c)(1),
(2) Date: Sep. 29, 2020

(87) PCT Pub. No.: WO2019/190925
PCT Pub. Date: Oct. 3, 2019

(65) Prior Publication Data
US 2021/0147592 A1 May 20, 2021

Related U.S. Application Data

(60) Provisional application No. 62/650,423, filed on Mar. 30, 2018.

(51) Int. Cl.
| | |
|---|---|
| *C08F 4/52* | (2006.01) |
| *C08F 4/64* | (2006.01) |
| *C08F 210/16* | (2006.01) |
| *C07F 5/06* | (2006.01) |
| *C08F 4/76* | (2006.01) |
| *C08F 4/642* | (2006.01) |
| *C08F 10/02* | (2006.01) |

(52) U.S. Cl.
CPC ............ *C08F 210/16* (2013.01); *C07F 5/069* (2013.01); *C08F 4/52* (2013.01); *C08F 4/642* (2013.01); *C08F 4/76* (2013.01); *C08F 4/64193* (2013.01); *C08F 10/02* (2013.01)

(58) Field of Classification Search
CPC ........ C08F 4/642; C08F 4/64193; C08F 4/52; C08F 10/02; C08F 210/16
See application file for complete search history.

(56) References Cited

U.S. PATENT DOCUMENTS

| | | |
|---|---|---|
| 3,773,733 A | 11/1973 | Matsushima |
| 3,860,622 A | 1/1975 | Wade |
| 4,677,088 A | 6/1987 | Huff et al. |
| 5,347,024 A | 9/1994 | Nickias et al. |
| 5,447,895 A | 9/1995 | Marks et al. |
| 5,536,797 A | 7/1996 | Nickias et al. |
| 5,763,549 A | 6/1998 | Elder et al. |
| 5,807,939 A | 9/1998 | Elder et al. |
| 5,895,771 A | 4/1999 | Epstein et al. |
| 5,919,983 A | 7/1999 | Rosen et al. |
| 6,153,776 A | 11/2000 | Patton et al. |
| 6,177,376 B1 | 1/2001 | Fritze et al. |
| 6,221,941 B1 | 4/2001 | Strauss et al. |
| 6,284,697 B1 | 9/2001 | Windisch et al. |
| 6,392,076 B1 | 5/2002 | Strauss et al. |
| 6,395,671 B2 | 5/2002 | LaPointe |
| 6,455,650 B1 | 9/2002 | Lipian et al. |
| 6,462,156 B2 | 10/2002 | LaPointe |
| 6,627,573 B2 | 9/2003 | Babb et al. |
| 6,777,509 B2 | 8/2004 | Brown et al. |
| 6,869,904 B2 | 3/2005 | Boussie et al. |
| 6,900,321 B2 | 5/2005 | Boussie et al. |
| 6,953,764 B2 | 10/2005 | Frazier et al. |
| 7,078,546 B2 | 7/2006 | Piers et al. |
| 7,511,104 B2 | 3/2009 | Pehlert et al. |
| 7,579,416 B2 | 8/2009 | Mihan |
| 7,619,047 B2 | 11/2009 | Yang et al. |
| 7,650,930 B2 | 1/2010 | Cheluget et al. |

(Continued)

FOREIGN PATENT DOCUMENTS

| | | |
|---|---|---|
| CA | 2254601 A1 | 11/1998 |
| CN | 1270596 A | 10/2000 |

(Continued)

OTHER PUBLICATIONS

McGuinness, D.S.; Rucklidge, A.J.; Tooze, R.P.; Slawin, A.M.Z. Organometallics 2007, 26, 2561-2569. (Year: 2007).*
European Office Communication pursuant to Article 94(3) EPC dated Jul. 13, 2022 for European Patent Application No. 19716692. 9, 5 pgs.
Arriola et al., "Catalytic Production of Olefin Block Copolymers via Chain Shuttling Polymerization", Science, 2006, 312, 714-719.
Busico, V., "Metal-catalysed olefin polymerisation into the new millennium: a perspective outlook", Dalton Transactions 2009, 8794-8802.
Delferro et al., "Multinuclear Olefin Polymerization Catalysts", Chem. Rev. 2011, 111, 2450-2485.

(Continued)

Primary Examiner — Rip A Lee
(74) Attorney, Agent, or Firm — Dinsmore & Shohl LLP

(57) ABSTRACT

Embodiments of the disclosure include processes of polymerizing olefins. The process includes contacting ethylene and a $(C_3-C_{40})$alpha-olefin comonomer in the presences of a catalyst system. The catalyst system comprises a procatalyst and a bimetallic activator complex. The bimetallic activator complex comprises an anion and a countercation, and the anion has a structure according to formula (I).

15 Claims, 1 Drawing Sheet

(56) References Cited

U.S. PATENT DOCUMENTS

| | | | |
|---|---|---|---|
| 7,683,194 | B2* | 3/2010 | Krossing ............... C07F 5/003 556/14 |
| 8,372,927 | B2 | 2/2013 | Figueroa et al. |
| 9,243,090 | B2 | 1/2016 | Arriola et al. |
| 9,349,895 | B2 | 5/2016 | Ikenaga et al. |
| 9,362,436 | B2 | 6/2016 | Nanjundiah et al. |
| 2004/0162215 | A1 | 8/2004 | Vogel |
| 2007/0149386 | A1 | 6/2007 | Mihan |
| 2008/0033125 | A1 | 2/2008 | Solan et al. |
| 2008/0249264 | A1 | 10/2008 | Hanefeld et al. |
| 2008/0275189 | A1 | 11/2008 | Carnahan et al. |
| 2008/0311812 | A1 | 12/2008 | Arriola et al. |
| 2009/0209713 | A1 | 8/2009 | McGuiness et al. |
| 2009/0270571 | A1 | 10/2009 | Wang et al. |
| 2010/0048842 | A1 | 2/2010 | Figueroa et al. |
| 2015/0094433 | A1 | 4/2015 | Hoang et al. |
| 2015/0094434 | A1 | 4/2015 | Tohi et al. |
| 2015/0099856 | A1 | 4/2015 | Hoang et al. |
| 2019/0040086 | A1 | 2/2019 | Holub et al. |
| 2021/0054119 | A1 | 2/2021 | Senecal et al. |

FOREIGN PATENT DOCUMENTS

| | | | | |
|---|---|---|---|---|
| CN | 102451758 | A | * 5/2012 | ............... B01J 31/22 |
| EP | 707014 | A1 | 4/1996 | |
| EP | 824112 | A1 | 2/1998 | |
| EP | 856523 | A1 | 8/1998 | |
| EP | 573403 | B1 | 11/1998 | |
| EP | 1056752 | A1 | 12/2000 | |
| EP | 1074555 | A2 | 2/2001 | |
| EP | 1308449 | A2 | 5/2003 | |
| EP | 2221328 | A2 | 8/2010 | |
| EP | 2468758 | A2 | 6/2012 | |
| FR | 2942230 | A1 | 8/2010 | |
| JP | 11286491 | A | 10/1999 | |
| JP | 20110231292 | A | 11/2011 | |
| WO | 9735893 | A1 | 10/1997 | |
| WO | 9849212 | A1 | 11/1998 | |
| WO | 9906413 | A1 | 2/1999 | |
| WO | 91/15534 | A1 | 4/1999 | |
| WO | 9941294 | A1 | 8/1999 | |
| WO | 0053611 | A1 | 9/2000 | |
| WO | 0063262 | A2 | 10/2000 | |
| WO | 3123442 | A1 | 4/2001 | |
| WO | 0130785 | A1 | 5/2001 | |
| WO | 0158969 | A1 | 8/2001 | |
| WO | 03101936 | A1 | 12/2003 | |
| WO | 2005054254 | A1 | 6/2005 | |
| WO | 2005063829 | A1 | 7/2005 | |
| WO | 2007136494 | A2 | 11/2007 | |
| WO | 2007136496 | A2 | 11/2007 | |
| WO | 2008038173 | A2 | 4/2008 | |
| WO | 2010022228 | A2 | 2/2010 | |
| WO | 2010139684 | A1 | 12/2010 | |
| WO | 2011102989 | A1 | 8/2011 | |
| WO | 2014209927 | A1 | 12/2014 | |
| WO | 2017173080 | A1 | 10/2017 | |

OTHER PUBLICATIONS

Ewen, J.A., "Propylene Polymerizations with Metallocene/Teal/Trityl Tetrakis (Pentafluorophenyl) Aluminate Mixtures", Catalyst Research Corporation, Houston, Texas, pp. 405-410.

Galland et al., "13C NMR Determination of the Composition of Linear Low-Density Polyethylene Obtained with [è3-Methallyl-nickel-diimine]PF6 Complex", Macromolecules 1999, 32, 1620-1625.

Gao et al., "Highly Soluble Bis-(Alkyl Substituted Carbenium) Bis-borate as Binuclear Cocatalysts for Olefin Polymerizations", Department of Chemistry, Northwestern University, pp. 1-4.

Gao et al., "Supporting Information for Highly Soluble Bis-(Alkyl Substituted Carbenium) Bis-borate as Binuclear Cocatalysts for Olefin Polymerizations", Department of Chemistry, Northwestern University, S1-S26.

International Search Report and Written Opinion pertaining to PCT/US2019/023643, dated Jul. 3, 2019.

International Search Report and Written Opinion pertaining to PCT/US2019/024034, dated Jun. 26, 2019.

International Search Report and Written Opinion pertaining to PCT/US2019/024075, dated Jun. 26, 2019.

International Search Report and Written Opinion pertaining to PCT/US2019/024599, dated Jul. 10, 2019.

International Search Report and Written Opinion pertaining to PCT/US2019/024754, dated Jul. 30, 2019.

Jung et al., "Analysis of Chain Branch of Polyolefins by a New Proton NMR Approach", Anal. Chem. 2016, 88, 1516-1520.

Klosin et al., "Development of Group IV Molecular Catalysts for High Temperature Ethylene-α-Olefin Copolymerization Reactions", Acc. Chem. Res. 2015, 48, 2004-2016.

Kraft et al., "Synthesis and Application of Strong Bransted Acids Generated from the Lewis Acid Al(ORF)3 and an Alcohol", Organometallics 2012, 31 (21), 7485-7491.

Krossing, I., "The Facile Preparation of Weakly Coordinating Anions: Structure and Characterisation of Silverpolyfluoroalkoxyaluminates AgAl(ORF)4, Calculation of the Alkoxide Ion Affinity", Chem. Eur. J. 2001, 7, 490.

Krossing, I., "Chemistry with Weakly-Coordinating Fluorinated Alkoxyaluminate Anions: Gas Phase Cations in Condensed Phases?", Coord. Chem. Rev., 2006, 250, 2721-2744.

Lapointe et al., "New Family of Weakly Coordinating Anions", J. Am. Chem. Soc., 2000, 122, 9560-9561.

Li et al., "Coordination Copolymerization of Severely Encumbered Isoalkenes with Ethylene: Enhanced Enchainment Mediated by Binuclear Catalysts and Cocatalysts", J. Am. Chem. Soc. 2005, 127, 14756-14768.

Li et al., "Nuclearity and cooperativity effects in binuclear catalysts and cocatalysts for olefin polymerization", Proc. Natl. Acad. Sci U. S. A. 2006,103, 15295-15302.

Li et al., "Catalyst/Cocatalyst Nuclearity Effects in Single-Site Polymerization. Enhanced Polyethylene Branching and r-Olefin Comonomer Enchainment in Polymerizations Mediated by Binuclear Catalysts and Cocatalysts via a New Enchainment Pathway", J. Am. Chem. Soc. 2002, 124, 12725-12741.

Makio et al., "FI Catalysts for Olefin Polymerization—A Comprehensive Treatment", Chem. Rev. 2011, 111, 2363-2449.

McGuinness et al., "Cocatalyst Influence in Selective Oligomerization: Effect on Activity, Catalyst Stability, and 1-Hexene/1-Octene Selectivity in the Ethylene Trimerization and Tetramerization Reaction", Organometallics 2007, 26 (10), 2561-2569.

McInnis et al., "Multinuclear Group 4 Catalysis: Olefin Polymerization Pathways Modified by Strong Metal—Metal Cooperative Effects", Acc. Chem. Res. 2014, 47, 2545-2557.

Pangborn et al., "Safe and Convenient Procedure for Solvent Purification", Organometallics 1996, 15 (5), 1518-1520.

Nakazawa et al., "A Synthetic Two-Spin Quantum Bit: g-Engineered Exchange-Coupled Biradical Designed for Controlled-NOT Gate Operations", Angew. Chem., Int. Ed. 2012, 51, 9860-9864.

Strauss et al., "Relative Lewis Basicities of Six Al(ORF)4ÿ Superweak Anions and the Structures of LiAl{OCH(CF3)2}4 and [1-Et-3-Me-1,3-C3H3N2]-[Li{Al{OCH(CF3)2}4}2]", Chem. Eur. J. 2001, 7, 503.

Strauss et al., "LiAl(OC(Ph)(CF3)2)4: A Hydrocarbon-Soluble Catalyst for Carbon-Carbon Bond-Forming Reactions", Organometallics 1996, 15, 3776.

Sturzel et al., "From Multisite Polymerization Catalysis to Sustainable Materials and All-Polyolefin Composites", Chem. Rev. 2016, 116, 1398-1433.

Sun et al., "Al-, Nb- and Ta-based Perfluoroaryloxide Anions as Cocatalysts for Metallocene-Mediated Ziegler-Natta Olefin Polymerization", Organometallics, 2000, 1625-1627.

Yano et al., "Influence of activators on ethylene polymerization with -diphenylmethylidene-cyclopentadienyl/-fluorenyl/zirconium dichloride catalysts at high temperature", J. Mol. Catal. A: Chem. 1999, 148, 77.

(56) References Cited

OTHER PUBLICATIONS

International Search Report and Written Opinion dated Sep. 13, 2021 pertaining to International application No. PCT/US2021/031233 filed May 7, 2021, 11 pages.
U.S. Notice of Allowance and Fee(s) Due dated Apr. 26, 2022 pertaining to U.S. Appl. No. 17/043,304, filed Sep. 29, 2020, pp. 1-13.
Krossing, Ingo et al. "New reagents to introduce weakly coordinating anions of type Al(ORF)4-: synthesis, structure and characterization of Cs and trityl salts" Journal of Fluorine Chemistry, 2001, pp. 83-90, 112, Elsevier Science B.V.
Metz, Matthew V. et al. "Weakly Coordinating Al-, Nb-, Ta-, Y-, and La-Based Perfluoroaryloxymetalate Anions as Cocatalyst Components for Single-Site Olefin Polymerization" Organometallics, 2002, pp. 3691-3702, 21.
U.S. Office Action dated Aug. 11, 2021 pertaining to U.S. Appl. No. 17/043,304, filed Sep. 29, 2020, 29 pages.
Non-Final Office Action dated Jan. 14, 2022, pertaining to U.S. Appl. No. 17/043,483, 22 pages.
Chinese Office Action, dated Sep. 21, 2022, pertaining to Chinese Patent Application No. 201980021695.2, 7 pages.
Chinese Search Report, dated Sep. 21, 2022, pertaining to Chinese Patent Application No. 201980021695.2, 4 pages.
International Search Report and Written Opinion dated Sep. 13, 2021 pertaining to Int'l Patent Application No. PCT/US2021/031233, 32 pgs.
Chinese Office Action, dated Sep. 21, 2022, pertaining to Chinese Patent Application No. 201980021980.4, 2 pages.
Chinese Search Report, dated Sep. 21, 2022, pertaining to Chinese Patent Application No. 201980021980.4, 3 pages.

\* cited by examiner

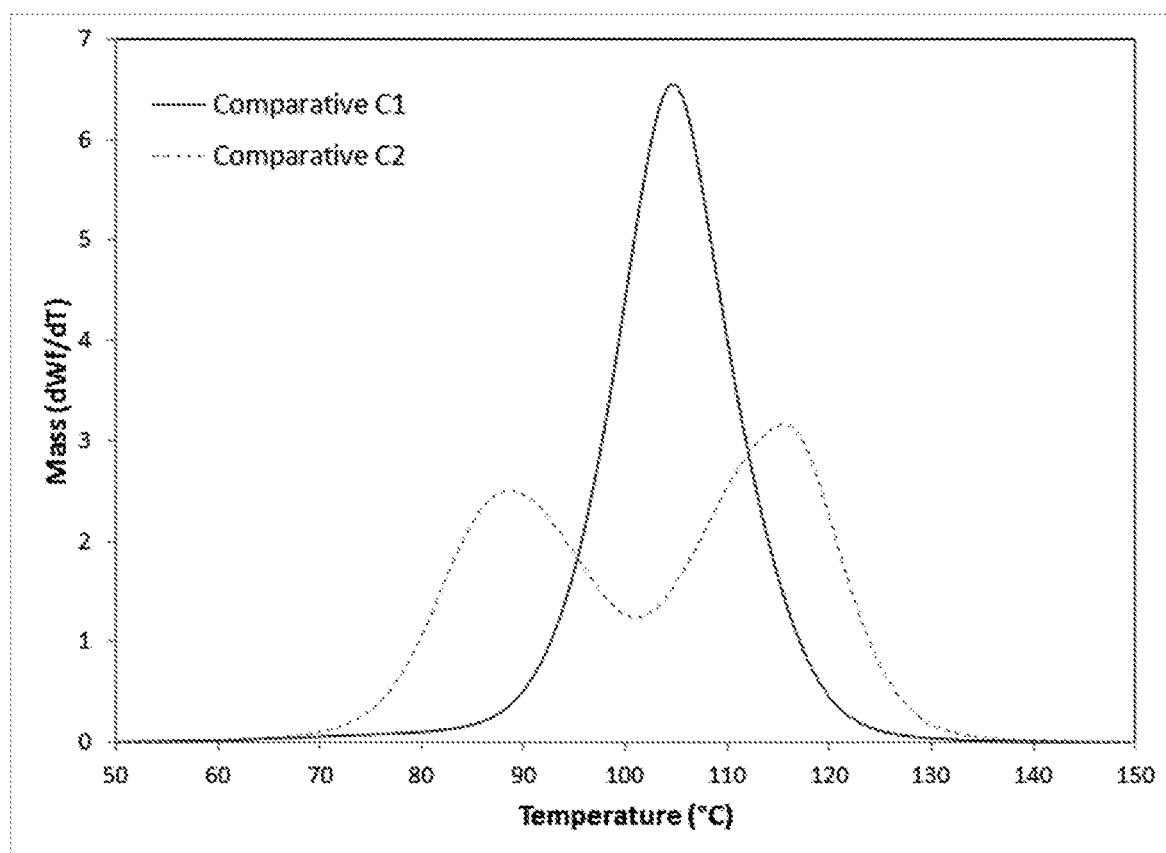

BINUCLEAR OLEFIN POLYMERIZATION ACTIVATORS

CROSS-REFERENCE TO RELATED APPLICATIONS

This application is a National Stage Entry under 35 U.S.C. § 371 of International Patent Application No. PCT/US2019/023643, filed Mar. 22, 2019, which claims the benefit of U.S. Provisional Patent Application Ser. No. 62/650,423 filed Mar. 30, 2018, both of which are hereby incorporated by reference in their entireties.

TECHNICAL FIELD

Embodiments of the present disclosure generally relate to olefin polymerization catalyst systems and processes and, more specifically the catalyst systems include a procatalyst and a bimetallic activator complex or co-catalyst.

BACKGROUND

As part of the catalyst composition in α-olefin polymerization reactions, the activator may have characteristics that are beneficial for the production of the α-olefin polymer and for final polymer compositions including the α-olefin polymer. Activator characteristics that increase the production of α-olefin polymers include, but are not limited to: rapid procatalyst activation, high catalyst efficiency, high temperature capability, consistent polymer composition, and selective deactivation.

Olefin-based polymers such as ethylene-based polymers and propylene-based polymers are produced via various catalyst systems. Selection of such catalyst systems can be an important factor contributing to the characteristics and properties of olefin-based polymers. The catalyst systems for producing polyethylene-based polymers may include a chromium-based catalyst system, a Ziegler-Natta catalyst system, or a molecular (either metallocene or non-metallocene) catalyst system.

As part of the catalyst system, the molecular polymerization procatalyst is activated to generate the catalytically active species for polymerization, and this can be achieved by any number of means. One such method employs an activator or co-catalyst that is a Brønsted acid. Brønsted acid salts containing weakly coordinating anions are commonly utilized to activate molecular polymerization procatalysts, particularly such procatalysts comprising Group IV metal complexes. Brønsted acid salts that are fully ionized are capable of transferring a proton to form a cationic derivative of such Group IV metal complexes.

For activators such as Brønsted acid salts, the cationic component may include cations capable of transferring a hydrogen ion such as ammonium, sulfonium, or phosphonium for example; or oxidizing cations such as ferrocenium, silver (I), or lead (II) cations, for example; or highly Lewis acidic cations such as carbonium or silylium, for example.

However, once the cations of the activator or co-catalyst activate the procatalyst, the activators may remain in the polymer composition. As a result, the cations and anions may affect the polymer composition. Since not all ions diffuse equally, different ions affect the polymer composition differently. In particular, the size of the ion, the charge of the ion, the interaction of the ion with the surrounding medium, and the dissociation energy of the ion with available counterions will affect the ion's ability to diffuse through a surrounding medium such as a solvent, a gel, or a polymer material.

Conventional olefin polymerization activators include weakly-coordinating or non-coordinating anions. It has been shown that weak coordination of the anion leads to increased catalytic efficiency of the cationic catalyst. However, since the non-nucleophilic character of the non-coordinating anion also increases diffusion, the residual activator anion in the produced polymer will lower the electrical resistance of the polymer, thereby increasing electrical loss, and thereby decreasing the insulation ability of the produced polymer.

SUMMARY

Desirable characteristics of activators in polymer systems include abilities to increase the production of olefin-based polymers, to increase the rate of procatalyst activation, to increase the overall efficiency of the catalyst, to enable the catalyst system to operate at high temperatures, to enable the catalyst system to provide consistent polymer composition, and to enable decomposition of the activator after olefin polymerization is complete. Activators derived from the non-coordinating anion tetrakis(pentafluorophenyl)borate ($^-B(C_6F_5)_4$) capture many of these desirable characteristics. Nevertheless, under typical polymerization reaction conditions, the $^-B(C_6F_5)_4$ anion fails to decompose readily and may remain intact in the final polymer. The presence of an intact activator in the final polymer can be deleterious to the electrical properties of the final polymer.

Activators based on partially hydrolyzed metal trialkyls, such as methylalumoxane (MAO) or modified methylalumoxane (MMAO), for example, decompose more readily than the $^-B(C_6F_5)_4$ anion, but suffer from poor high-temperature catalyst efficiency and broader compositional drift in the final polymer.

There are ongoing needs for activators that efficiently activate a metal-ligand procatalyst, that are readily broken down, and that perform well at high temperature. The catalyst systems of the present disclosure include, in combination with Group IV metal-ligand complexes, activators, or co-catalysts that address such needs. In particular, the activators readily react with and activate the Group IV metal-ligand procatalyst complexes for the production of polyolefin resins, and the polyolefin resins exhibit useful polymer composition and electrical properties. The activators included in the catalyst systems of this disclosure exhibit characteristics, such as abilities to increase the production of α-olefin polymers, to increase the rate of procatalyst activation, to increase the overall efficiency of the catalyst to enable the catalyst system to operate at high temperatures, to enable the catalyst system to provide consistent polymer composition, and to enable decomposition of the activators.

The compounds of this disclosure relate to a class of compounds useful as the activator or co-catalyst component of a catalyst system in the production of polyolefin resins. The catalyst composition of this disclosure may be employed in an appropriate α-olefin polymerization process to deliver polyolefins with polymer composition and electrical properties superior to those derived from other available catalyst compositions. The activators of this disclosure include beneficial characteristics such as rapid procatalyst activation, high catalyst efficiency, high temperature capability, consistent polymer composition, selective deactivation, and good electrical properties.

According to some embodiments, processes of polymerizing olefins include contacting ethylene and a $(C_3\text{-}C_{40})\alpha$-olefin comonomer in the presence of a catalyst system that includes a procatalyst and a bimetallic activator complex, the bimetallic activator complex comprising an anion and a countercation, the anion having a structure according to formula (I):

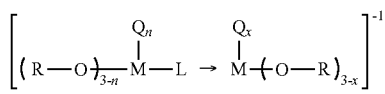
(I)

In formula (I), each M is independently aluminum, boron, or gallium; L is chosen from a species having at least two Lewis base sites. Each Q is independently a monodentate ligand, and subscript x is 0, 1, or 2, and when subscript x is 0, Q of $Q_x$ is not present; subscript n is 0, 1, or 2, and when subscript n is 0, Q of $Q_n$ is not present. Each R is independently selected from the group consisting of radicals having formula (II) and radicals having formula (III):

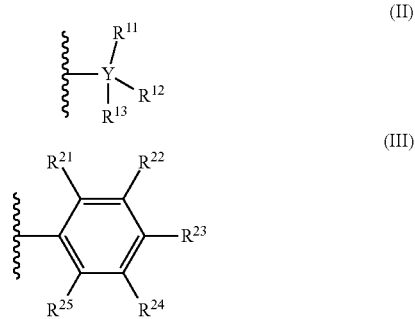

In formulas (II) and (III), each Y is independently carbon or silicon; each $R^{11}$, $R^{12}$, $R^{13}$, $R^{21}$, $R^{22}$, $R^{23}$, $R^{24}$, and $R^{25}$ is independently chosen from $(C_1\text{-}C_{40})$alkyl, $(C_6\text{-}C_{40})$aryl, —H, —NR$^N_2$, —OR$^C$, —SR$^C$, or halogen, wherein when R is a radical according to formula (II), at least one of $R^{11}$, $R^{12}$, and $R^{13}$ is a halogen-substituted $(C_1\text{-}C_4)$alkyl, a halogen-substituted $(C_6\text{-}C_4)$aryl, or —F. When R is a radical according to formula (III), at least one of $R^{21}$, $R^{22}$, $R^{23}$, $R^{24}$, and $R^{25}$ is a fluorine-substituted $(C_1\text{-}C_{40})$alkyl, a fluorine-substituted $(C_6\text{-}C_{40})$aryl, or —F; and the countercation has a formal charge of +1.

According to some embodiments, processes for polymerizing olefins include contacting ethylene and a $(C_3\text{-}C_{40})$ alpha-olefin comonomer in the presence of a catalyst system that includes a Group IV metal-ligand complex and a bimetallic activator complex. The bimetallic activator complex includes an anion and a countercation, the anion having a structure according to formula (I).

BRIEF DESCRIPTION OF THE DRAWINGS

The FIGURE is a thermal gradient interaction chromatography (TGIC) spectrum of molecular weight as a function of temperature of two comparative activators.

DETAILED DESCRIPTION

Specific embodiments of catalyst systems will now be described. It should be understood that the catalyst systems of this disclosure may be embodied in different forms and should not be construed as limited to the specific embodiments set forth in this disclosure.

Common abbreviations are listed below:

R, Y, M, L, Q, and n: as defined above; Me: methyl; Et: ethyl; Ph: phenyl; Bn: benzyl; i-Pr: iso-propyl; t-Bu: tert-butyl; t-Oct: tert-octyl (2,4,4-trimethylpentan-2-yl); Tf: trifluoromethane sulfonate; ($^t$Bu$^F$O)$_3$Al: Al(OC(CF$_3$)$_3$)$_3$; THF: tetrahydrofuran; Et$_2$O diethyl ether; CH$_2$Cl$_2$: dichloromethane; CV: column volume (used in column chromatography); EtOAc: ethyl acetate; C$_6$D$_6$: deuterated benzene or benzene-d6: CDCl$_3$: deuterated chloroform; Na$_2$SO$_4$: sodium sulfate; MgSO$_4$: magnesium sulfate; HCl hydrogen chloride; n-BuLi: butyllithium; t-BuLi: tert-butyllithium; N$_2$: nitrogen gas; PhMe: toluene; PPR: parallel polymerization reactor; MAO: methylaluminoxane; MMAO: modified methylaluminoxane; GC: gas chromatography; LC: liquid chromatography; NMR: nuclear magnetic resonance; MS: mass spectrometry; mmol: millimoles; mL: milliliters; M: molar; min or mins: minutes; h or hrs: hours; d: days; R$_f$: retention fraction; TLC thin-layer chromatography; rpm: revolutions per minute.

The term "independently selected" is used herein to indicate that the R groups, such as, $R^1$, $R^2$, $R^3$, $R^4$, and $R^5$, can be identical or different (e.g., $R^1$, $R^2$, $R^3$, $R^4$, and $R^5$ may all be substituted alkyls or $R^1$ and $R^2$ may be a substituted alkyl and $R^3$ may be an aryl, etc.). A chemical name associated with an R group is intended to convey the chemical structure that is recognized in the art as corresponding to that of the chemical name. Thus, chemical names are intended to supplement and illustrate, not preclude, the structural definitions known to those of skill in the art.

The term "procatalyst" refers to a compound that has catalytic activity when combined with an activator. The term "activator" refers to a compound that chemically reacts with a procatalyst in a manner that converts the procatalyst to a catalytically active catalyst. As used herein, the terms "cocatalyst" and "activator" are interchangeable terms.

When used to describe certain carbon atom-containing chemical groups, a parenthetical expression having the form "$(C_x\text{-}C_y)$" means that the unsubstituted form of the chemical group has from x carbon atoms to y carbon atoms, inclusive of x and y. For example, a $(C_1\text{-}C_5)$alkyl is an alkyl group having from 1 to 50 carbon atoms in its unsubstituted form. In some embodiments and general structures, certain chemical groups may be substituted by one or more substituents such as $R^S$. An $R^S$ substituted chemical group defined using the "$(C_x\text{-}C_y)$" parenthetical may contain more than y carbon atoms depending on the identity of any groups $R^S$. For example, a "$(C_1\text{-}C_{50})$alkyl substituted with exactly one group $R^S$, where $R^S$ is phenyl (—C$_6$H$_5$)" may contain from 7 to 56 carbon atoms. Thus, in general when a chemical group defined using the "$(C_x\text{-}C_y)$" parenthetical is substituted by one or more carbon atom-containing substituents $R^S$, the minimum and maximum total number of carbon atoms of the chemical group is determined by adding to both x and y the combined sum of the number of carbon atoms from all of the carbon atom-containing substituents $R^S$.

The term "substitution" means that at least one hydrogen atom (—H) bonded to a carbon atom or heteroatom of a corresponding unsubstituted compound or functional group is replaced by a substituent (e.g., $R^S$). The term "—H" means a hydrogen or hydrogen radical that is covalently bonded to another atom. "Hydrogen" and "—H" are interchangeable, and unless clearly specified have identical meanings.

The term "halogen-substituted" means that at least one hydrogen atom (—H) bonded to a carbon atom or heteroatom of a corresponding unsubstituted compound or functional group is replaced by a halogen. The term "halogen-substituted" and "halogenated" are interchangeable. The term "perhalogenated" means that every hydrogen atom (—H) bonded to a carbon atom or heteroatom of a corresponding unsubstituted compound or functional group is replaced by a halogen. The term "fluorine-substituted" means that at least one hydrogen atom (—H) bonded to a carbon atom or heteroatom of a corresponding unsubstituted compound or functional group is replaced by a fluorine atom.

In this disclosure, the term "halogen atom" or "halogen" means the radical of a fluorine atom (F) or chlorine atom (Cl). The term "halide" means anionic form of the halogen atom, e.g., fluoride ($F^-$) or chloride ($Cl^-$).

The term "$(C_1-C_{50})$hydrocarbyl" means a hydrocarbon radical of from 1 to 50 carbon atoms and the term "$(C_1-C_{50})$hydrocarbylene" means a hydrocarbon diradical of from 1 to 50 carbon atoms, in which each hydrocarbon radical and each hydrocarbon diradical is aromatic or non-aromatic, saturated or unsaturated, straight chain or branched chain, cyclic (having three carbons or more, and including mono- and poly-cyclic, fused and non-fused polycyclic, and bicyclic) or acyclic, and substituted by one or more $R^S$ or unsubstituted.

In this disclosure, a $(C_1-C_{50})$hydrocarbyl may be an unsubstituted or substituted $(C_1-C_{50})$alkyl, $(C_3-C_{50})$cycloalkyl, $(C_3-C_{20})$cycloalkyl-$(C_1-C_{20})$alkylene, $(C_6-C_{40})$aryl, or $(C_6-C_{20})$aryl-$(C_1-C_{20})$alkylene (such as benzyl (—CH$_2$—C$_6$H$_5$)).

The terms "$(C_1-C_{50})$alkyl" and "$(C_1-C_{18})$alkyl" mean a saturated straight or branched hydrocarbon radical of from 1 to 50 carbon atoms and a saturated straight or branched hydrocarbon radical of from 1 to 18 carbon atoms, respectively, that is unsubstituted or substituted by one or more $R^S$. Examples of unsubstituted $(C_1-C_{50})$alkyl are unsubstituted $(C_1-C_{20})$alkyl; unsubstituted $(C_1-C_{10})$alkyl; unsubstituted $(C_1-C_5)$alkyl; methyl; ethyl; 1-propyl; 2-propyl; 1-butyl; 2-butyl; 2-methylpropyl; 1,1-dimethylethyl; 1-pentyl; 1-hexyl; 1-heptyl; 1-nonyl; and 1-decyl. Examples of substituted $(C_1-C_{40})$alkyl are substituted $(C_1-C_{20})$alkyl, substituted $(C_1-C_{10})$alkyl, trifluoromethyl, and [$C_{45}$]alkyl. The term "[$C_{45}$]alky" means there is a maximum of 45 carbon atoms in the radical, including substituents, and is, for example, a $(C_{27}-C_{40})$alkyl substituted by one $R^S$, which is a $(C_1-C_5)$alkyl, respectively. More broadly, the term "[$C_z$]alkyl" means there is a maximum of z carbon atoms, wherein z is a positive integer, in the radical, including substituents. Each $(C_1-C_5)$alkyl may be methyl, trifluoromethyl, ethyl, 1-propyl, 1-methylethyl, or 1,1-dimethylethyl.

The term "$(C_6-C_{50})$aryl" means an unsubstituted or substituted (by one or more $R^S$) mono-, bi- or tricyclic aromatic hydrocarbon radical of from 6 to 40 carbon atoms, of which at least from 6 to 14 of the carbon atoms are aromatic ring carbon atoms. A monocyclic aromatic hydrocarbon radical includes one aromatic ring; a bicyclic aromatic hydrocarbon radical has two rings; and a tricyclic aromatic hydrocarbon radical has three rings. When the bicyclic or tricyclic aromatic hydrocarbon radical is present, at least one of the rings of the radical is aromatic. The other ring or rings of the aromatic radical may be independently fused or non-fused and aromatic or non-aromatic. Examples of unsubstituted $(C_6-C_{50})$aryl include: unsubstituted $(C_6-C_{20})$aryl, unsubstituted $(C_6-C_{18})$aryl; $C_1-C_5)$alkyl-phenyl; phenyl; fluorenyl; tetrahydrofluorenyl; indacenyl; hexahydroindacenyl; indenyl; dihydroindenyl; naphthyl; tetrahydronaphthyl; and phenanthrene. Examples of substituted $(C_6-C_{40})$aryl include: substituted $(C_1-C_{20})$aryl; substituted $(C_6-C_{18})$aryl; 2,4-bis([$C_{20}$]alkyl)-phenyl; polyfluorophenyl; pentafluorophenyl; and fluoren-9-one-1-.

The term "$(C_3-C_{50})$cycloalkyl" means a saturated cyclic hydrocarbon radical of from 3 to 50 carbon atoms that is unsubstituted or substituted by one or more $R^S$. Other cycloalkyl groups (e.g., $(C_x-C_y)$cycloalkyl) are defined in an analogous manner as having from x to y carbon atoms and being either unsubstituted or substituted with one or more $R^S$. Examples of unsubstituted $(C_3-C_{40})$cycloalkyl are unsubstituted $(C_3-C_{20})$cycloalkyl, unsubstituted $(C_3-C_{10})$cycloalkyl, cyclopropyl, cyclobutyl, cyclopentyl, cyclohexyl, cycloheptyl, cyclooctyl, cyclononyl, and cyclodecyl. Examples of substituted $(C_3-C_{40})$cycloalkyl are substituted $(C_3-C_{20})$cycloalkyl, substituted $(C_3-C_{10})$cycloalkyl, cyclopentanon-2-yl, and 1-fluorocyclohexyl.

Examples of $(C_1-C_{50})$hydrocarbylene include unsubstituted or substituted $(C_6-C_{50})$arylene, $(C_3-C_{50})$cycloakyene, and $(C_1-C_{50})$alkylene (e.g., $(C_1-C_{20})$alkylene). The diradicals may be on the same carbon atom (e.g., —CH$_2$—) or on adjacent carbon atoms (i.e., 1,2-diradicals), or are spaced apart by one, two, or more than two intervening carbon atoms (e.g., 1,3-diradicals, 1,4-diradicals, etc.). Some diradicals include 1,2-, 1,3-, 1,4-, or α,ω-diradicals. The α,ω-diradical is a diradical that has maximum carbon backbone spacing between the radical carbons. Some examples of $(C_2-C_{20})$alkylene α,ω-diradicals include ethan-1,2-diyl (i.e., —CH$_2$CH$_2$—), propan-1,3-diyl (i.e., —CH$_2$CH$_2$CH$_2$—), 2-methylpropan-1,3-diyl (i.e., —CH$_2$CH(CH$_3$)CH$_2$—). Some examples of $(C_6-C_{50})$arylene α,ω-diradicals include phenyl-1,4-diyl, napthalen-2,6-diyl, or napthalen-3,7-diyl.

The term "$(C_1-C_{50})$alkylene" means a saturated straight chain or branched chain diradical (i.e., the radicals are not on ring atoms) of from 1 to 50 carbon atoms that is unsubstituted or substituted by one or more $R^S$. Examples of unsubstituted $(C_1-C_{50})$alkylene are unsubstituted $(C_1-C_{20})$alkylene, including unsubstituted —CH$_2$CH$_2$—, —(CH$_2$)$_3$—, —(CH$_2$)$_4$—, —(CH$_2$)$_5$—, —(CH$_2$)$_6$—, —(CH$_2$)$_7$—, —(CH$_2$)$_8$—, —CH$_2$C*HCH$_3$, and —(CH$_2$)$_4$C*(H)(CH$_3$ in which "C*" denotes a carbon atom from which a hydrogen atom is removed to form a secondary or tertiary alkyl radical. Examples of substituted $(C_1-C_{50})$alkylene are substituted $(C_1-C_{20})$alkylene, —CF$_2$—, —C(O)—, and —(CH$_2$)$_{14}$C(CH$_3$)$_2$(CH$_2$)$_5$— (i.e., a 6,6-dimethyl-substituted normal-1,20-eicosylene). Since as mentioned previously two $R^S$ may be taken together to form a $(C_1-C_{18})$alkylene, examples of substituted $(C_1-C_{50})$alkylene also include 1,2-bis(methylene)cyclopentane, 1,2-bis(methylene)cyclohexane, 2,3-bis(methylene)-7,7-dimethyl-bicyclo[2.2.1]heptane, and 2,3-bis(methylene)bicyclo[2.2.2]octane.

The term "$(C_3-C_{50})$cycloalkylene" means a cyclic diradical of from 3 to 50 carbon atoms that is unsubstituted or substituted by one or more $R^S$. Both radicals of the cyclic diradical are on ring atoms of the cyclic diradical.

The term "heteroatom," refers to an atom other than hydrogen or carbon. Examples of groups containing one or more than one heteroatom include O, S, S(O), S(O)$_2$, Si($R^C$)$_2$, P($R^P$), N($R^N$), —N=C($R^C$)$_2$, —Ge($R^C$)$_2$—, or —Si($R^C$)—, where each $R^C$ and each $R^P$ is unsubstituted $(C_1-C_{18})$hydrocarbyl or —H, and where each $R^N$ is unsubstituted $(C_1-C_{18})$hydrocarbyl. The term "heterohydrocarbon" refers to a molecule or molecular framework in which one or more carbon atoms of a hydrocarbon are replaced with a heteroatom. The term "$(C_1-C_{50})$heterohydrocarbyl" means a heterohydrocarbon radical of from 1 to 50 carbon atoms, and the term "$(C_1-C_{50})$heterohydrocarbylene" means a heterohydrocarbon diradical of from 1 to 50 carbon atoms. The heterohydrocarbon of the $(C_1-C_{50})$heterohydrocarbyl or the $(C_1-C_{50})$heterohydrocarbylene has one or more heteroatoms. The radical of the heterohydrocarbyl may be on a carbon atom or a heteroatom. The two radicals of the heterohydrocarbylene may be on a single carbon atom or on a single heteroatom. Additionally, one of the two radicals of the diradical may be on a carbon atom and the other radical may be on a different carbon atom; one of the two radicals may be on a carbon atom and the other on a heteroatom; or one of the two radicals may be on a heteroatom and the other radical may be on a different heteroatom. Each $(C_1-C_{50})$ heterohydrocarbyl and $(C_1-C_{50})$heterohydrocarbylene may be unsubstituted or substituted (by one or more R) aromatic or non-aromatic, saturated or unsaturated, straight chain or branched chain, cyclic (including mono- and poly-cyclic, fused and non-fused polycyclic), or acyclic.

The term "$(C_1-C_{50})$heterohydrocarbon anion" means an anionic heterohydrocarbon having from 1 to 50 carbon atoms and a formal charge of negative one (−1). The formal charge may be associated with a heteroatom, provided that there is more than one heteroatom in the anionic heterohydrocarbon. The heterohydrocarbon anion is aromatic or non-aromatic, saturated or unsaturated, straight chain or branched chain, cyclic (having three carbons or more, and including monocyclic and poly-cyclic, fused and non-fused polycyclic, and bicyclic) or acyclic, and substituted by one or more $R^S$ or unsubstituted. When the heteroaromatic anion is aromatic ("$(C_1-C_{50})$heteroaromatic anion"), at least one heteroatom is within the aromatic system. The lone pairs of electrons of the anion of the heteroaromatic anion are not a part of the aromatic system, and are available to form ionic bonds or dative covalent bonds.

The $(C_1-C_{50})$heterohydrocarbyl may be unsubstituted or substituted. Non-limiting examples of the $(C_1-C_{50})$heterohydrocarbyl include $(C_1-C_{50})$heteroalkyl, $(C_1-C_{50})$hydrocarbyl-O—, $(C_1-C_{50})$hydrocarbyl-S—, $(C_1-C_{50})$hydrocarbyl-S(O)—$(C_1-C_{50})$hydrocarbyl-S(O)$_2$—, $(C_1-C_{50})$hydrocarbyl-Si($R^C$)$_2$—, $(C_1-C_{50})$hydrocarbyl-N($R^N$)($C_1-C_{20}$)hydrocarbyl-P($R^P$), $(C_2-C_{50})$heterocycloalkyl, $(C_2-C_{19})$heterocycloalkyl-$(C_1-C_{20})$alkylene, $(C_3-C_{20})$cycloalkyl-$(C_1-C_{19})$heteroalkylene, $(C_1-C_{19})$heterocycloalkyl-$(C_1-C_{20})$heteroalkylene, $(C_1-C_{50})$heteroaryl, $(C_1-C_{19})$heteroaryl-$(C_1-C_{20})$alkylene, $(C_6-C_{20})$aryl-$(C_1-C_{19})$heteroalkylene, or $(C_1-C_{19})$heteroaryl-$(C_1-C_{20})$heteroalkylene.

The term "$(C_4-C_{50})$heteroaryl" means an unsubstituted or substituted (by one or more $R^S$) monocyclic, bicyclic, or tricyclic heteroaromatic hydrocarbon radical of from 4 to 50 total carbon atoms and from 1 to 10 heteroatoms. A monocyclic heteroaromatic hydrocarbon radical includes one heteroaromatic ring; a bicyclic heteroaromatic hydrocarbon radical has two rings; and a tricyclic heteroaromatic hydrocarbon radical has three rings. When the bicyclic or tricyclic heteroaromatic hydrocarbon radical is present, at least one of the rings in the radical is heteroaromatic. The other ring or rings of the heteroaromatic radical may be independently fused or non-fused and aromatic or non-aromatic. Other heteroaryl groups (e.g., $(C_x-C_y)$heteroaryl generally, such as $(C_4-C_{12})$heteroaryl) are defined in an analogous manner as having from x to y carbon atoms (such as 4 to 12 carbon atoms) and being unsubstituted or substituted by one or more than one $R^S$. The monocyclic heteroaromatic hydrocarbon radical is a 5-membered ring or a 6-membered ring.

The 5-membered ring monocyclic heteroaromatic hydrocarbon radical has 5 minus h carbon atoms, where h is the number of heteroatoms and may be 1, 2, 3, or 4; and each heteroatom may be O, S, N, or P. Examples of 5-membered ring heteroaromatic hydrocarbon radicals include pyrrol-1-yl; pyrrol-2-yl; furan-3-yl; thiophen-2-yl; pyrazol-1-yl; isoxazol-2-yl; isothiazol-5-yl; imidazol-2-yl; oxazol-4-yl; thiazol-2-yl; 1,2,4-triazol-1-yl; 1,3,4-oxadiazol-2-yl; 1,3,4-thiadiazol-2-yl; tetrazol-1-yl; tetrazol-2-yl; and tetrazol-5-yl.

The 6-membered ring monocyclic heteroaromatic hydrocarbon radical has 6 minus h carbon atoms, where h is the number of heteroatoms and may be 1 or 2 and the heteroatoms may be N or P. Examples of 6-membered ring heteroaromatic hydrocarbon radicals include pyridine-2-yl; pyrimidin-2-yl; and pyrazin-2-yl.

The bicyclic heteroaromatic hydrocarbon radical can be a fused 5,6- or 6,6-ring system. Examples of the fused 5,6-ring system bicyclic heteroaromatic hydrocarbon radical are indol-1-yl; and benzimidazole-1-yl. Examples of the fused 6,6-ring system bicyclic heteroaromatic hydrocarbon radical are quinolin-2-yl; and isoquinolin-1-yl. The tricyclic heteroaromatic hydrocarbon radical can be a fused 5,6,5-; 5,6,6-; 6,5,6-; or 6,6,6-ring system. An example of the fused 5,6,5-ring system is 1,7-dihydropyrrolo[3,2-f]indol-1-yl. An example of the fused 5,6,6-ring system is 1H-benzo[f]indol-1-yl. An example of the fused 6,5,6-ring system is 9H-carbazol-9-yl. An example of the fused 6,6,6-ring system is acrydin-9-yl.

The term "$(C_1-C_{50})$heteroalkyl" means a saturated straight or branched chain radical containing one to fifty carbon atoms, and one or more heteroatom. The term "$(C_1-C_{50})$heteroalkylene" means a saturated straight or branched chain diradical containing from 1 to 50 carbon atoms and one or more than one heteroatom. The heteroatoms of the heteroalkyls or the heteroalkylenes may be Si($R^C$)$_3$, Ge($R^C$)$_3$, Si($R^C$)$_2$, Ge($R^C$)$_2$, P($R^P$)$_2$, P($R^P$), N($R^N$)$_2$, N($R^N$), N, O, O$R^C$, S, S$R^C$, S(O), and S(O)$_2$, wherein each of the heteroalkyl and heteroalkylene groups are unsubstituted or are substituted by one or more $R^S$.

Examples of unsubstituted $(C_2-C_{40})$heterocycloalkyl include unsubstituted $(C_2-C_{20})$heterocycloalkyl, unsubstituted $(C_2-C_{10})$heterocycloalkyl, aziridin-1-yl, oxetan-2-yl, tetrahydrofuran-3-yl, pyrrolidin-1-yl, tetrahydrothiophen-S, S-dioxide-2-yl, morpholin-4-yl, 1,4-dioxan-2-yl, hexahydroazepin-4-yl, 3-oxa-cyclooctyl, 5-thio-cyclononyl, and 2-aza-cyclodecyl.

The term "saturated" means lacking carbon-carbon double bonds, carbon-carbon triple bonds, and (in heteroatom-containing groups) carbon-nitrogen, carbon-phosphorus, and carbon-silicon double bonds. Where a saturated chemical group is substituted by one or more substituents $R^S$, one or more double and/or triple bonds optionally may be present in substituents $R^S$. The term "unsaturated" means containing one or more carbon-carbon double bonds or carbon-carbon triple bonds, or (in heteroatom-containing groups) one or more carbon-nitrogen double bonds, carbon-phosphorus double bonds, or carbon-silicon double bonds, not including double bonds that may be present in substituents $R^S$, if any, or in aromatic rings or heteroaromatic rings, if any.

Embodiments of this disclosure include processes for polymerizing olefins. In embodiments, the process includes contacting ethylene and one or more $(C_3-C_{40})$alpha-olefin comonomers in the presence of a catalyst system to produce a polymer resin. The catalyst systems may include a bimetallic activator complex, the bimetallic according having a countercation and an anion according to formula (I):

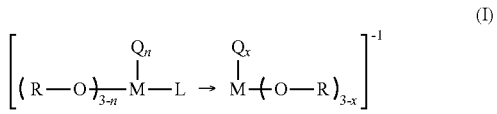

(I)

In formula (I), each M is independently aluminum, boron, or gallium; L is chosen from a species having at least two Lewis basic sites. Each Q is independently a monodentate ligand, and subscript x is 0, 1, or 2, and when subscript x is 0, Q of $Q_x$ is not present; subscript n is 0, 1, or 2, and when subscript n is 0, Q of $Q_n$ is not present. Each R is independently selected from the group consisting of radicals having formula (II) and radicals having formula (III):

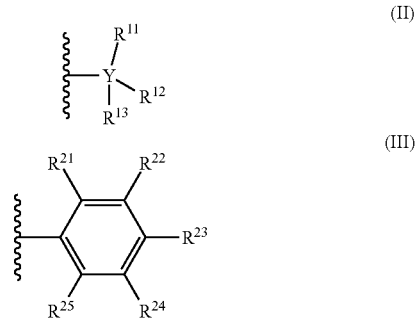

In formula (II), Y is independently carbon or silicon; $R^{11}$, $R^{12}$, $R^{13}$ are independently chosen from $(C_1-C_{40})$alkyl, $(C_6-C_{40})$aryl, —H, —$NR^N_2$, —$OR^C$, —$SR^C$, or halogen. In one or more embodiments, when R is a radical having the formula (II), at least at least one of $R^{11}$, $R^{12}$, or $R^{13}$ is perhalogenated $(C_1-C_4)$alkyl, perhalogenated $(C_6-C_{40})$aryl, or —F. In some embodiments, when R is a radical having the formula (II), at least at least one of $R^{11}$, $R^{12}$, or $R^{13}$ is a halogen-substituted $(C_1-C_{40})$alkyl, a halogen-substituted $(C_6-C_{40})$aryl, or —F; each $R^N$ or $R^C$ is independently $(C_1-C_{30})$hydrocarbyl or —H.

In formula (III), $R^{21}$, $R^{22}$, $R^{23}$, $R^{24}$, and $R^{25}$ are independently chosen from $(C_1-C_{40})$alkyl, $(C_6-C_{40})$aryl, —H, —$NR^N_2$, —$OR^C$, —$SR^C$, or halogen. In one or more embodiments, when R is a radical having the formula (III), at least at least one of $R^{21}$, $R^{22}$, $R^{23}$, $R^{24}$, or $R^{25}$ is perhalogenated $(C_1-C_{40})$alkyl, perhalogenated $(C_6-C_{40})$aryl, or —F. In some embodiments, when R is a radical having the formula (III), at least at least one of $R^{21}$, $R^{22}$, $R^{23}$, $R^{24}$, or $R^{25}$ is a halogen-substituted $(C_1-C_{40})$alkyl, a halogen-substituted $(C_6-C_{40})$aryl, or —F; each $R^N$ or $R^C$ is independently $(C_1-C_{30})$hydrocarbyl or —H.

In one or more embodiments, the bimetallic activator complex includes the anion according to formula (I) and the countercation having a formal charge of positive one (+1). In some embodiments of the bimetallic ionic complex, the countercation is chosen from a protonated tri[$(C_1-C_{40})$hydrocarbyl] ammonium cation. In some embodiments, the countercation is a protonated trialkylammonium cation, containing one or two $(C_{14}-C_{20})$alkyl groups on the ammonium cation. In one or more embodiments, the countercation is +N(H)$R^N_3$, where each $R^N$ is chosen from $(C_1-C_{20})$alkyl or $(C_6-C_{20})$aryl. In one or more embodiments, the countercation is +N(H)$R^N_3$, where at least two $R^N$ are chosen from $(C_{10}-C_{20})$alkyl. In one or more embodiments, the countercation is $^+$N(H)$R^N_3$, wherein $R^N$ is $(C_{16}-C_{18})$alkyl. In one or more embodiments, the countercation is $^+$N(CH$_3$)H$R^N_2$, wherein $R^N$ is $(C_{16}-C_{18})$alkyl. In some embodiments, the countercation is chosen from methyldi(octadecyl)ammonium cation, methyl(octadecyl)(hexadecyl)ammonium cation, methyldi(hexadecyl)ammonium cation, or methyldi(tetradecyl)ammonium cation. The methyldi(octadecyl) ammonium cation, methyl(octadecyl)(hexadecyl) ammonium cation, methyldi(hexadecyl)ammonium cation, or methyldi(tetradecyl)ammonium cation are collectively referred to herein as armeenium cations. Ionic compounds having armeenium cations are easily formed by protonating (with anhydrous —HCl in ether, for example) methyldi (octadecyl)amine, methyl(octadecyl)(hexadecyl)amine, methyldi(hexadecyl)amine, or methyldi(tetradecyl)amine which are available from Akzo-Nobel under the Armeen™ trade names, for example Armeen™ M2HT. In other embodiments, the countercation is triphenylmethyl carbocation ($^+$C(C$_6$H$_5$)$_3$), also referred to as trityl. In one or more embodiments, the countercation is a tris-substituted-triphenylmethyl carbocation, such as $^+$C(C$_6$H$_4$R$^C$)$_3$, wherein each $R^C$ is independently chosen from $(C_1-C_{30})$alkyl. In other embodiments, the countercation is chosen from anilinium, ferrocenium, or aluminoceniums. Anilinium cations are protonated nitrogen cations, such as [HN($R^S$)($R^N$)$_2$]$^+$, where $R^N$ is $(C_1-C_{20})$alky or H and $R^S$ is chosen from $(C_6-C_{20})$aryl, and each alkyl or aryl may be further substituted with —$OR^C$, for example C$_6$H$_5$NMe$_2$H$^+$. Aluminoceniums are aluminum cations, such as $R^S_2$Al(THF)$_2$+, where $R^S$ is chosen from $(C_1-C_{30})$alkyl.

In one or more embodiments, L is a species containing two or more than two Lewis basic sites. In some embodiments, L is an anionic species containing at least two Lewis basic sites. The anionic species may be polyatomic or monoatomic (such as chloride or fluoride). Each Lewis basic site may be on a different atom of the anionic species or each Lewis basic site may be on the same atom of the anionic species. In some embodiments, L is chosen from $(C_1-C_{20})$ heterohydrocarbon anion, $(C_2-C_{10})$heteroaromatic anion, $^-$OC(O)$R^L$, $^-$S(O)$_3R^L$, $^-$P(O)$_3R^L$, —P(O)$_2$(O$R^L$)$_3$, $^-$N$R^L_2$, $^-$O$R^L$, $^-$S$R^L$, or halide, wherein $R^L$ is —H, $(C_1-C_{30})$hydrocarbyl, or halogen-substituted $(C_1-C_{30})$hydrocarbyl. In some embodiments, L is $^-$OC(O)$R^L$, $R^L$ is chosen from —C$_6$F$_5$, —CH$_3$ (methyl), ethyl, propyl, 2-propyl, n-butyl, tert-butyl, 2,2-dimethylethyl, n-octyl, or tert-octyl (also called 1,1,3,3-tetramethylbutyl). In some embodiments, $R^L$ may be substituted with one or more than one halogen. In other embodiments, L is —OS(O)$_2$CF$_3$. In some embodiments, L anionic species containing two or more than two Lewis basic sites and is not a halogen or halide; specifically, L is anionic species containing two or more than two Lewis basic sites and is not fluoride (—F).

In some embodiments, L is a anionic compound having the formula (IV):

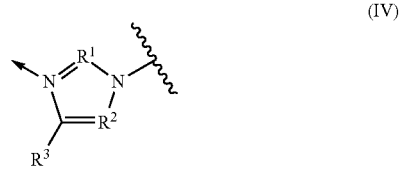

(IV)

In formula (IV), $R^1$ and $R^2$ are independently selected from —C($R^L$)— or —N—, wherein $R^L$ is —H, $(C_1-C_{30})$ hydrocarbyl, halogen-substituted $(C_1-C_{30})$hydrocarbyl, and $R^3$ is chosen from —H, $(C_1-C_{30})$hydrocarbyl, halogen-substituted $(C_1-C_{30})$hydrocarbyl. In some embodiments, $R^3$ is $(C_2-C_3)$heterohydrocarbylene connected to $R^2$.

In some one or more embodiments, when L is according to formula (IV), $R^1$ is —C($C_{11}H_{23}$)— and $R^2$ is —C(H)—. In some embodiments, R is —C(H)—, $R^2$ is —N—, and $R_3$ is —H. In other embodiments, $R^1$ is —N—, $R^2$ is —C(H)—, and $R^3$ is —H.

In one or more embodiments, when $R^2$ and $R^3$ are linked together to form a ring, L is selected from a radical having the formula (V):

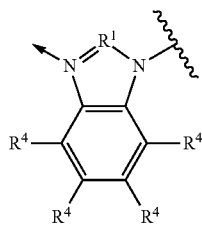

(V)

In formula (V), each $R^4$ is independently a $(C_1-C_{30})$ hydrocarbyl or —H; and $R^1$ is as previously defined in formula (IV).

In other embodiments, L is selected from radicals having a formula (VI):

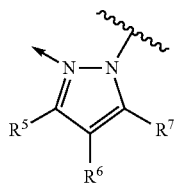

(VI)

In formula (VI), $R^5$, $R^6$, and $R^7$ are independently $(C_1-C_{30})$hydrocarbyl or —H.

In one or more embodiments, L is selected from radicals having a formula (VII):

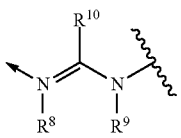

(VII)

In formula (VII), $R^{10}$ is chosen from the group —H, —NR$^N_2$, —SiR$^C_3$, —PR$^P_3$, $(C_1-C_{30})$hydrocarbyl; and each of $R^8$ and $R^9$ is chosen from —H or $(C_1-C_{30})$alkyl.

In some embodiments of the bimetallic activator complex of formula (I), each R is a radical having the formula (II), wherein Y is carbon, $R^{11}$, $R^{12}$, and $R^{13}$ are fluorine.

In some embodiments, each Q is independently a monodentate is chosen from unsaturated $(C_2-C_{50})$hydrocarbon, unsaturated $(C_2-C_{50})$heterohydrocarbon, $(C_1-C_{50})$hydrocarbyl, $(C_6-C_{50})$aryl, $(C_6-C_{50})$heteroaryl, cyclopentadienyl, substituted cyclopentadienyl, $(C_4-C_{12})$diene, halogen, —N(R$^N$)$_2$, and —NCOR$^C$, in which each R$^N$ and each R$^C$ are independently $(C_1-C_{20})$alkyl. In various embodiments, X is selected from methyl; ethyl; 1-propyl; 2-propyl; 1-butyl; 2,2-dimethylpropyl; trimethylsilylmethyl; phenyl; benzyl; or chloro. In some embodiments, each Q is identical. In one or more embodiments, subscript x of $Q_x$ is 0. In various embodiments, subscript n of $Q_n$ is 0.

In one or more embodiments, the bimetallic activator complex in a high-boiling-point fully saturated hydrocarbon solution containing a concentration of 200 micromoles of bimetallic activator complex and 20 millimoles of water in the high-boiling-point fully saturated hydrocarbon has a dissipation factor of less than or equal to 0.1, as measured by the Hydrocarbon Conductivity Test. In some embodiments, the dissipation factor of the bimetallic activator complex measured in the same manner has a dissipation factor of less than or equal to 0.05, less than or equal to 0.03, or less than or equal to 0.025. The high-boiling-point fully saturated hydrocarbon solution ("hydrocarbon solution") includes a high-boiling-point fully saturated hydrocarbon solvent, water, and the bimetallic activator complex. The high-boiling-point fully saturated hydrocarbon solvent may include a solvent having a boiling point from about 150° C. to about 190° C. Examples of such high-boiling-point fully saturated hydrocarbon solvents include squalane, dodecane, eicosane, or triacontane, for example.

The electrical properties of a polyolefin elastomer produced by a polymerization process according to this disclosure, specifically the polyolefin elastomer produced by the bimetallic activator complex according to formula (I) may be assessed relative to electrical properties of other polyolefin elastomers by a Hydrocarbon Conductivity (HC) Test. The HC Test simulates differences between the electrical properties of polyolefin elastomers produced by a comparative activator, such as methyldi($(C_{14}-C_{20})$alkyl)ammonium tetrakis(pentafluorophenyl)borate and the bimetallic activator complexes of this disclosure. In the HC Test, the activator is dissolved in a high-boiling-point fully saturated hydrocarbon solvent at room temperature. (Room temperature is approximately 22.0±2.5° C.)

The HC Test measures a dissipation factor (at 60 Hz) and a conductivity of the hydrocarbon samples. Each of the hydrocarbon samples is measured using a Novocontrol Technologies Broadband Dielectric Spectrometer (Alpha-A) using standard methods. Other than the gentle heating, all sample preparation steps and measurements were performed at room temperature.

To prepare the hydrocarbon samples for the HC Test, an amount of the activator is added to approximately 10 mL of hydrocarbon solvent to create samples having concentration of approximately 200 μM activator in solution. In a water-containing hydrocarbon sample, deionized water is added to obtain a concentration of approximately 20 mM, and an amount of activator is added to obtain a 200 μM activator hydrocarbon solution. All samples are heated to 250° C. to remove the water and any residual low-boiling-point solvents. The dissipation factor and conductivity are measured.

The ratio of total number of moles of the one or more Group IV metal-ligand complexes in the catalyst system to total number of moles of the one or more bimetallic activator complex in the catalyst system is from 1:10,000 to 100:1.

In illustrative embodiments, the catalyst systems may include a bimetallic activator complex comprising an anion and a countercation, in which the anion is according to formula (I). The countercation, which is complexed with the anion of formula (I), is not included in the illustrative embodiments. The illustrative embodiments of the anion of formula (I) include the following structures:

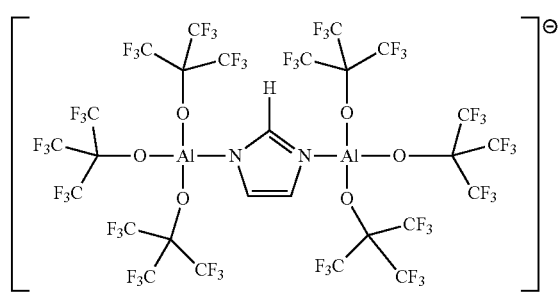
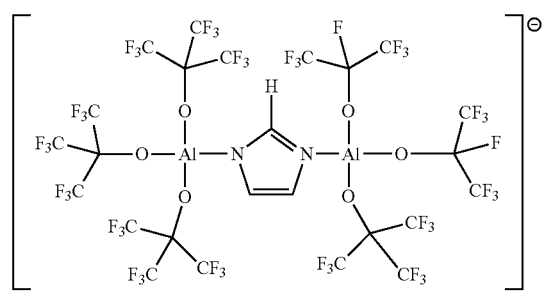
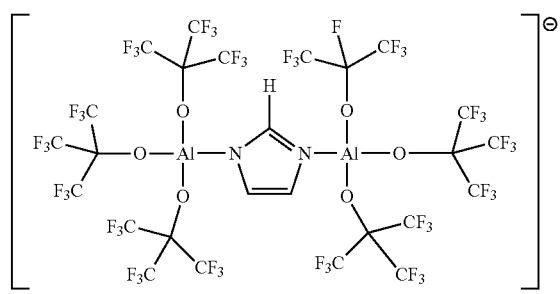
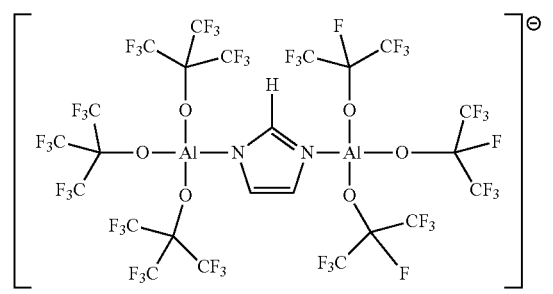
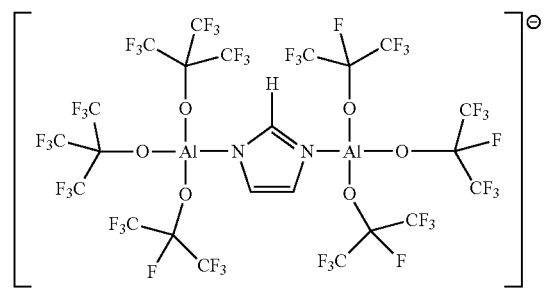
-continued
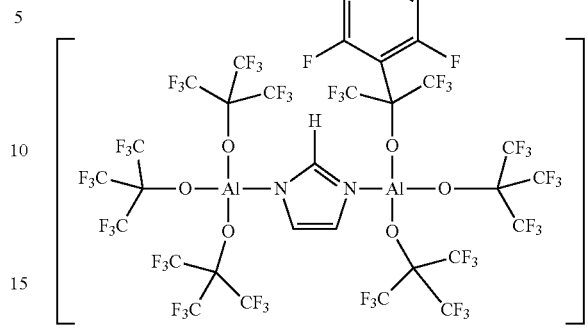
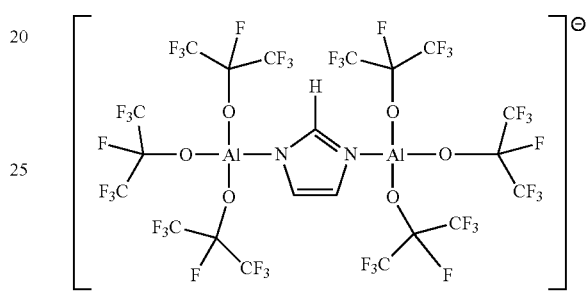
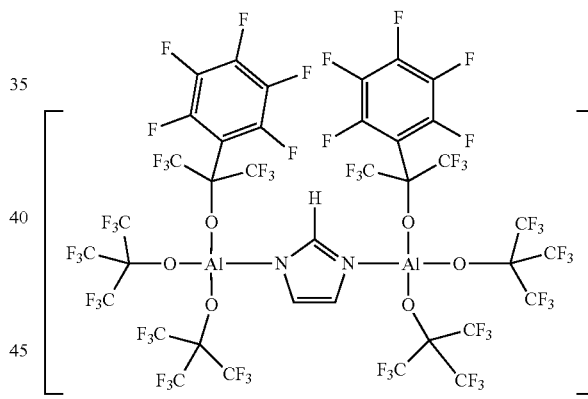
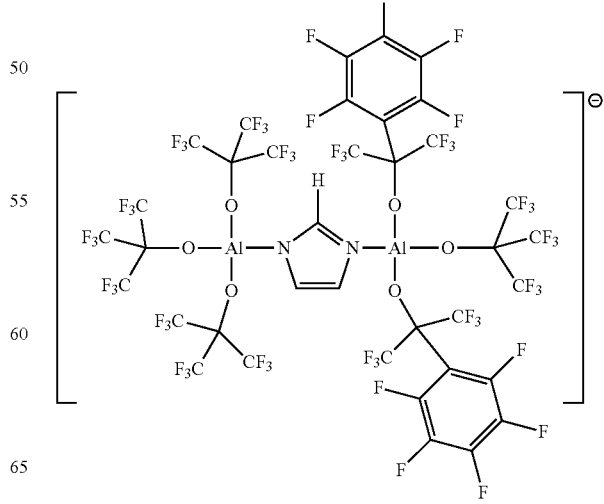

-continued
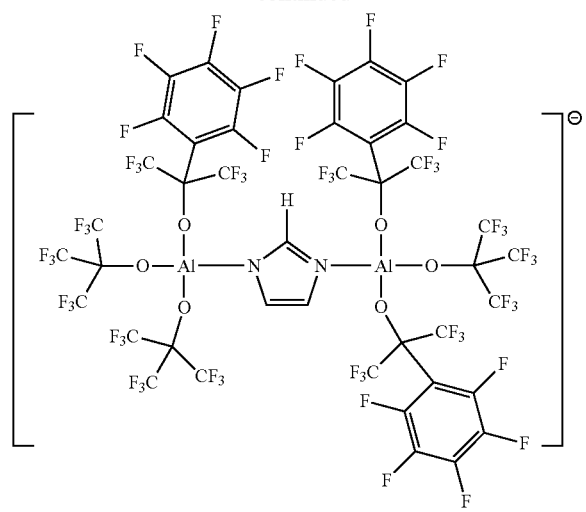
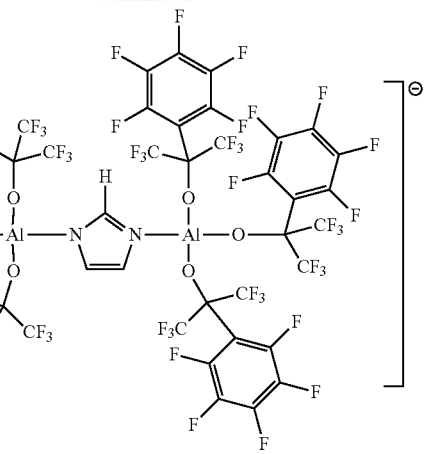
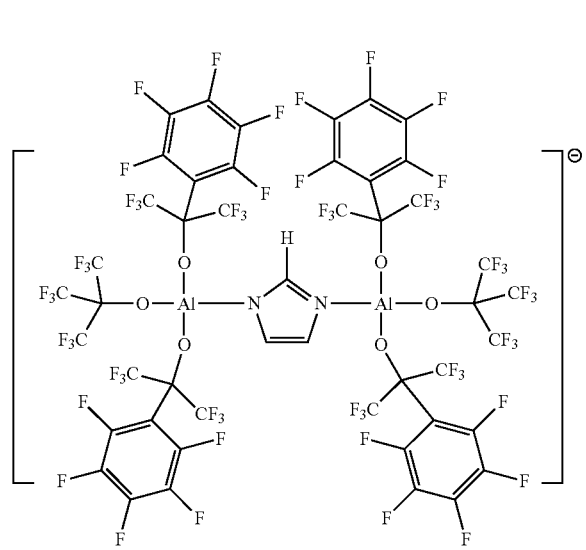
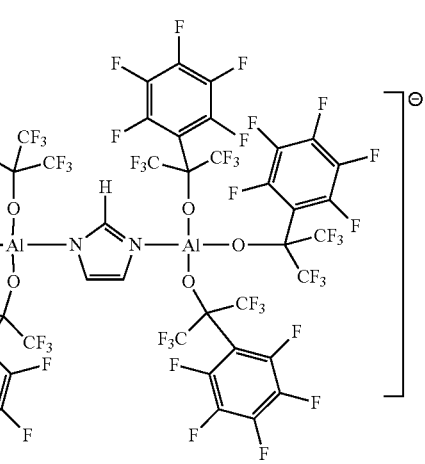
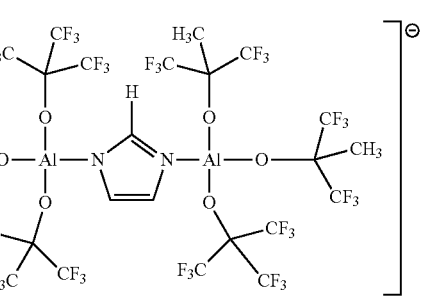
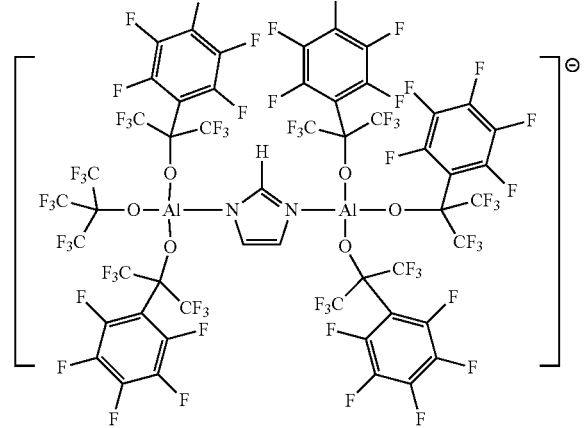
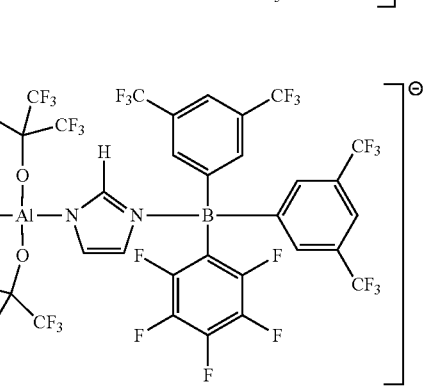

17
-continued
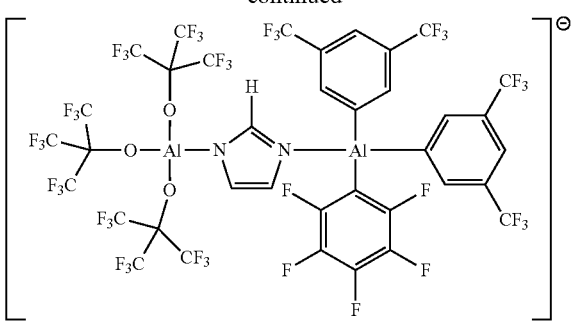
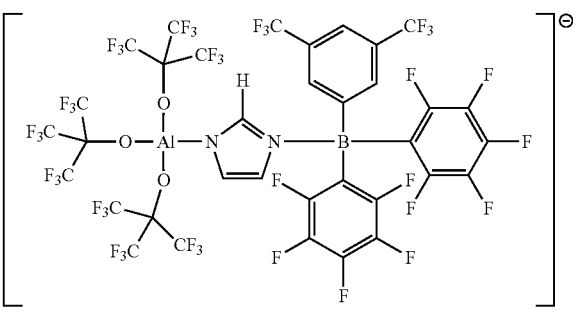
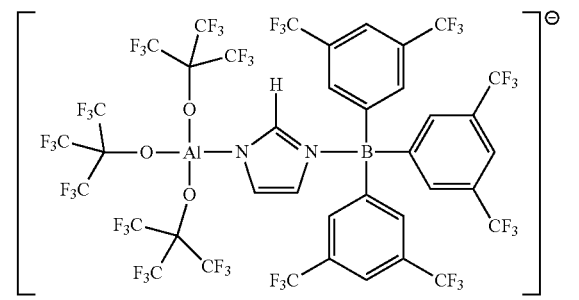
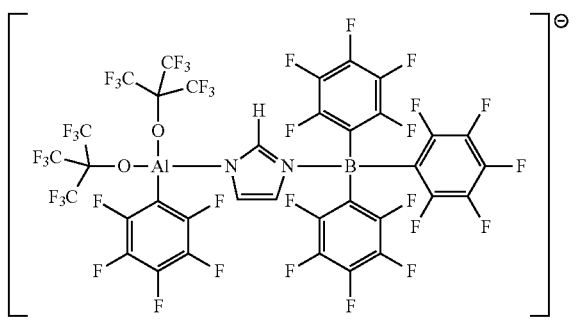
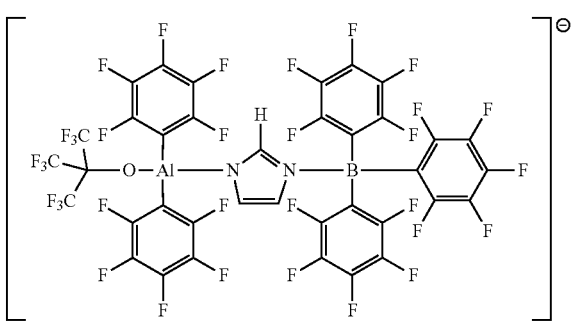
18
-continued
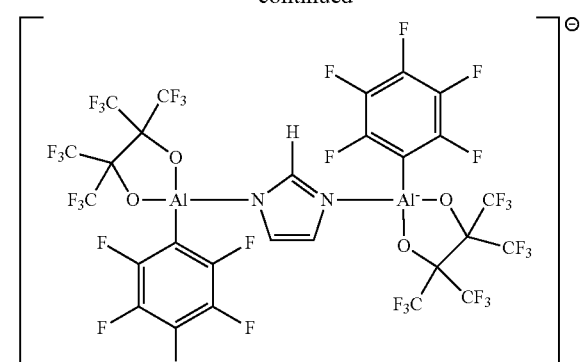
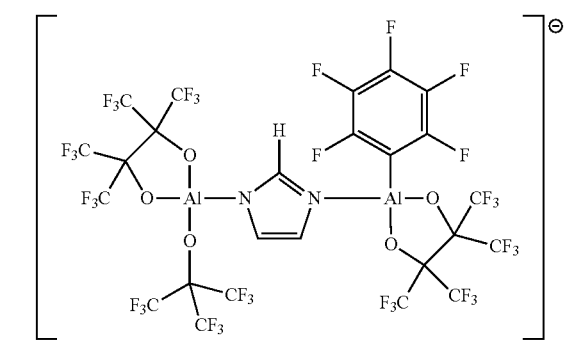
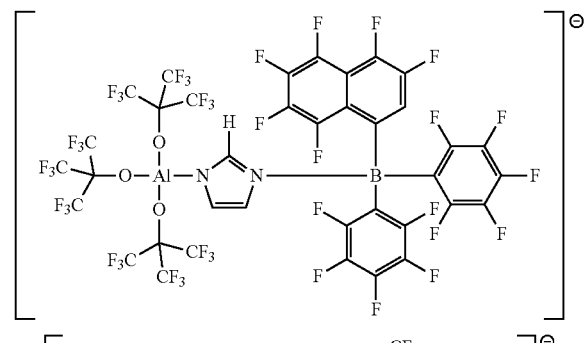
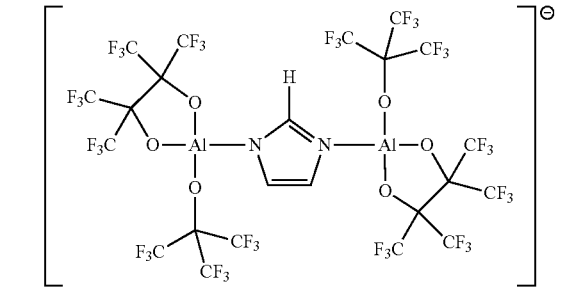
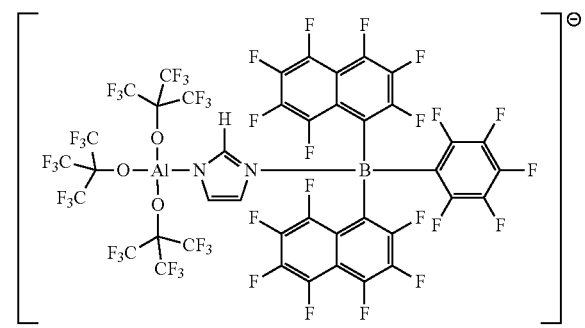

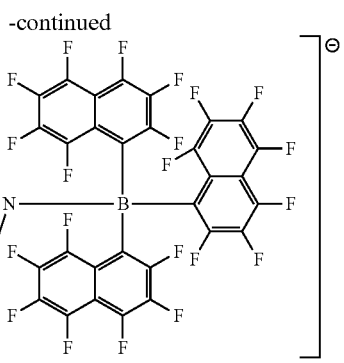

Polymeric Electrical Properties

Insulating mediums should be as efficient as possible. Electrical loss lowers the efficiency of a medium to insulate in the presence of an electric field. The resistance should be as high as possible for both alternating current (AC) and direct current (DC) systems, because the resistance is inversely related to the power or electric loss.

In a DC system (e.g., a photovoltaic encapsulant), energy loss manifests as the leakage of current from the encapsulated device to the external environment. This current (I) is directly related to the voltage (V) and inversely related to the resistance of the insulating medium (R) via the equation $I=V \times R^{-1}$. Therefore, the higher the resistance the lower the current and the current leakage.

In an AC system (e.g., cable insulation) loss manifests as the absorption of energy by the medium in the presence of an electrical field. Measured in power (P), this loss is determined by the equation $P=V^2 \times \omega \times C \times \varepsilon' \times \tan \delta$ where $\omega$ is the angular frequency, $\varepsilon'$ is the relative permittivity, C is the capacitance, and $\tan \delta$ is the dissipation factor, $\tan \delta = (C \times R \times \omega)^{-1}$, resulting in the equation $P=V^2 \times \varepsilon' \times R^{-1}$. Since the resistance is inversely related to the power loss, the higher the resistance, the lower the power loss.

One physical effect that lowers the resistance of a medium is the diffusion of ions due to an electric field. In a system in which ionic diffusion dominates the electrical response, the resistance is related to the diffusing ions via the equation $R=6 \times \pi \times \varepsilon' \times \varepsilon_0 \times \eta \times r \times C^{-1} \times q^{-2} \times N^{-1}$ where $\varepsilon_0$ is the permittivity of vacuum ($8.854 \times 10^{-12}$ F·m$^{-1}$), $\eta$ is the dynamic viscosity of the medium, r is the hydrodynamic radius of the ion, q is the charge of the ion, and N is the concentration of the ion. Since increased resistance decreases energy loss and a decrease in ion concentration increases resistance, a reduction in the concentration of ions diffusing through the medium decreases energy loss.

In addition to size and charge, the interaction of the ion with the surrounding medium and its dissociation energy with available counterions will affect its ability to diffuse through a given medium. Since not all ions diffuse equally, the ability of the ions in the activator to diffuse is an important characteristic. Without intending to be bound by theory, it is believed that when the anion of the ionic bimetallic activator complex of formula (I) and the countercation has a decreased diffusion, the resulting polymer of the bimetallic activator has a decreased in energy loss, which provides good electrical properties.

Catalyst System Components

The catalyst system may include a procatalyst. The procatalyst may be rendered catalytically active by contacting the complex to, or combining the complex with, a bimetallic activator having anion of formula (I) and a countercation. The procatalyst may be chosen from a Group IV metal-ligand complex (Group IVB according to CAS or Group 4 according to IUPAC naming conventions), such as a titanium (Ti) metal-ligand complex, a zirconium (Zr) metal-ligand complex, or a hafnium (Hf) metal-ligand complex. Not intending to be limiting, examples of the procatalyst may be found in the following references: U.S. Pat. No. 8,372,927; WO 2010022228; WO 2011102989; U.S. Pat. Nos. 6,953,764; 6,900,321; WO 2017173080; U.S. Pat. Nos. 7,650,930; 6,777,509 WO 99/41294; U.S. Pat. No. 6,869,904; WO 2007136496. Theses references are herein incorporated by reference in their entirety.

In one or more embodiments, the Group IV metal-ligand complex includes a bis(phenylphenoxy) Group IV metal-ligand complex or a constrained geometry Group IV metal-ligand complex.

According to some embodiments, the bis(phenylphenoxy) metal-ligand complex has a structure according to formula (X):

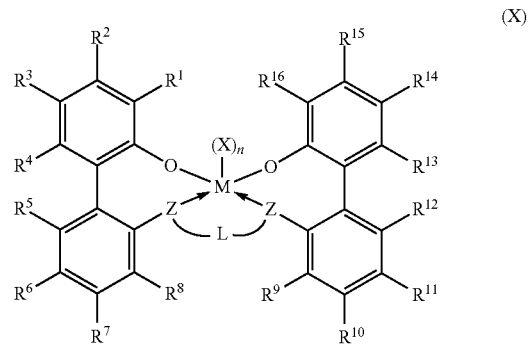

(X)

In formula (I), M is a metal chosen from titanium, zirconium, or hafnium, the metal being in a formal oxidation state of +2, +3, or +4. Subscript n of $(X)_n$ is 0, 1, or 2. When subscript n is 1, X is a monodentate ligand or a bidentate ligand, and when subscript n is 2, each X is chose from a monodentate ligand. L is a diradical selected from the group consisting of $(C_1-C_{40})$hydrocarbylene, $(C_1-C_{40})$heterohydrocarbylene, —Si(R$^C$)$_2$—, —Si(R$^C$)$_2$OSi(R$^C$)$_2$—, —Si(R$^C$)$_2$C(R$^C$)$_2$—, —Si(R$^C$)$_2$Si(R$^C$)$_2$—, —Si(R$^C$)$_2$C(R$^C$)$_2$Si(R$^C$)$_2$—, —C(R$^C$)$_2$Si(R$^C$)$_2$C(R$^C$)$_2$—, —N(R$^N$)C(R$^C$)$_2$—, —N(R$^N$)N(R$^N$)—, —C(R$^C$)$_2$N(R$^N$)C(R$^C$)$_2$—, —Ge(R$^C$)$_2$—, —P(R$^P$)—, —N(R$^N$)—, —O—, —S—, —S(O)—, —S(O)$_2$—, —N=C(R$^C$)—, —C(O)O—, —OC(O)—, —C(O)N(R)—, and —N(R$^C$)C(O)—. Each Z is independently chosen from —O—, —S—, —N(R$^N$)—, or —P(R$^P$)—; R through R$^{16}$ are independently selected from the group consisting of —H, $(C_1-C_{40})$hydrocarbyl, $(C_1-C_{40})$heterohydrocarbyl, —Si(R$^C$)$_3$, —Ge(R$^C$)$_3$, —P(R$^P$)$_2$, —N(R$^N$)$_2$, —OR$^C$, —SR$^C$, —NO$_2$, —CN, —CF$_3$, R$^C$S(O)—, R$^C$S(O)$_2$—, —N=C(R$^C$)$_2$, R$^C$C(O)O—, R$^C$OC(O)—, R$^C$C(O)N(R)—, (R$^C$)$_2$NC(O)—, halogen, radicals having formula (XI), radicals having formula (XII), and radicals having formula (XIII):

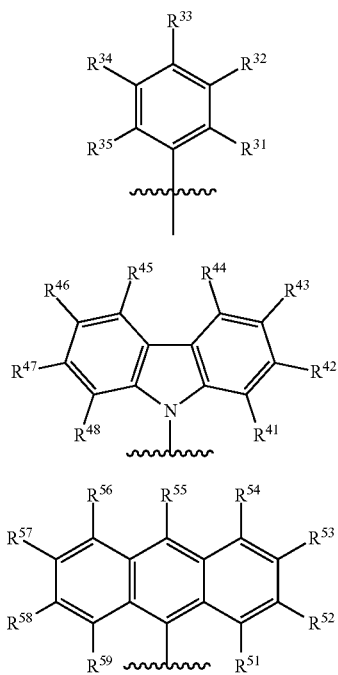

In formulas (XI), (XII), and (XIII), each of $R^{31}$-$R^{35}$, $R^{41}$-$R^{48}$, and $R^{51}$-$R^{59}$ is independently chosen from —H, $(C_1$-$C_4)$hydrocarbyl, $(C_1$-$C_4)$heterohydrocarbyl, —Si$(R^C)_3$, —Ge$(R^C)_3$, —P$(R^P)_2$, —N$(R^N)_2$, —OR$^C$, —SR$^C$, —NO$_2$, —CN, —CF$_3$, R$^C$S(O)—, R$^C$S(O)$_2$—, $(R^C)_2$C=N—, R$^C$C(O)O—, R$^C$OC(O)—, R$^C$C(O)N$(R^N)$—, $(R^C)_2$NC(O)—, or halogen, provided at least one of $R^1$ or $R^{16}$ is a radical having formula (XI), a radical having formula (XII), or a radical having formula (XIII).

In one or more embodiments, each X can be a monodentate ligand that, independently from any other ligands X, is a halogen, unsubstituted $(C_1$-$C_{20})$hydrocarbyl, unsubstituted $(C_1$-$C_{20})$hydrocarbylC(O)O—, or $R^K R^L$N—, wherein each of $R^K$ and $R^L$ independently is an unsubstituted$(C_1$-$C_{20})$ hydrocarbyl.

Illustrative bis(phenylphenoxy) metal-ligand complexes that may be employed in the practice of the present invention include:
(2',2''-(propane-1,3-diylbis(oxy))bis(5'-chloro-3-(3,6-di-tert-octyl-9H-carbazol-9-yl)-3'-methyl-5-(2,4,4-trimethylpentan-2-yl)biphenyl-2-ol)dimethyl-hafnium;
(2',2''-(propane-1,3-diylbis(oxy))bis(3-(3,6-di-tert-butyl-9H-carbazol-9-yl)-3'-chloro-5-(2,4,4-trimethylpentan-2-yl)biphenyl-2-ol)dimethyl-hafnium;
(2',2''-(propane-1,3-diylbis(oxy))bis(3'-chloro-3-(3,6-di-tert-butyl-9H-carbazol-9-yl)-5-fluoro-5-(2,4,4-trimethylpentan-2-yl)biphenyl-2-ol)dimethyl-hafnium;
(2',2''-(propane-1,3-diylbis(oxy))bis(3-(3,6-di-tert-butyl-9H-carbazol-9-yl)-3'-methyl-5-(2,4,4-trimethylpentan-2-yl)biphenyl-2-ol)dimethyl-hafnium;
(2',2''-(propane-1,3-diylbis(oxy))bis(5'-cyano-3-(3,6-di-tert-butyl-9-carbazol-9-yl)-3'-methyl-5-(2,4,4-trimethylpentan-2-yl)biphenyl-2-ol)dimethyl-hafnium;
(2',2''-(propane-1,3-diylbis(oxy))bis(5-trimethylamino-3-(3,6-di-tert-butyl-9H-carbazol-9-yl)-3'-methyl-5-(2,4,4-trimethylpentan-2-yl)biphenyl-2-ol)dimethyl-hafnium;
(2',2''-(propane-1,3-diylbis(oxy))bis(3',5'-dimethyl-3-(3,6-di-tert-butyl-9H-carbazol-9-yl)-5-(2,4,4-trimethylpentan-2-yl)biphenyl-2-ol)dimethyl-hafnium;
(2',2''-(propane-1,3-diylbis(oxy))bis(5'-chloro-3-(3,6-di-tert-butyl-9H-carbazol-9-yl)-3'-ethyl-5-(2,4,4-trimethylpentan-2-yl)biphenyl-2-oi)dimethyl-hafnium;
(2',2''-(propane-1,3-diylbis(oxy))bis(3-(3,6-di-tert-butyl-9H-carbazol-9-yl)-3'-methyl-5'-tert-butyl-5-(2,4,4-trimethylpentan-2-yl)biphenyl-2-ol)dimethyl-hafnium;
(2',2''-(propane-1,3-diylbis(oxy))bis(3-(3,6-di-tert-butyl-9H-carbazol-9-yl)-5'-fluoro-3'-methyl-5-(2,4,4-trimethylpentan-2-yl)biphenyl-2-ol)dimethyl-hafnium;
(2',2''-(propane-1,3-diylbis(oxy))bis(3-(9H-carbazol-9-yl)-5'-chloro-3'-methyl-5-(2,4,4-trimethylpentan-2-yl)biphenyl-2-ol)dimethyl-hafnium;
(2',2''-(propane-1,3-diylbis(oxy))bis(3-(3,6-di-tert-butyl-9-carbazol-9-yl)-3'-methyl-5'-trifluoromethyl-5-(2,4,4-trimethylpentan-2-yl)biphenyl-2-ol)dimethyl-hafnium;
(2',2''-(2,2-dimethyl-2-silapropane-1,3-diylbis(oxy))bis(35'-dichloro-3-(3,6-di-tert-butyl-9H-carbazol-9-yl)-5-(2,4,4-trimethylpentan-2-yl)biphenyl-2-ol)dimethyl-hafnium;
(2'2''-(2,2-dimethyl-2-silapropane-1-diylbis(oxy))bis(5'-chloro-3-(3,6-di-tert-butyl-9H-carbazol-9-yl)-3'-methyl-5-(2,4,4-trimethylpentan-2-yl)biphenyl-2-ol)dimethyl-hafnium;
(2',2''-(propane-1,3-diylbis(oxy))bis(3'-bromo-5'-chloro-3-(3,6-di-tert-butyl-9H-carbazol-9-yl)-5-(2,4,4-trimethylpentan-2-yl)biphenyl-2-ol)dimethyl-hafnium;
(2',2''-(propane-1,3-diylbis(oxy))-(5'-chloro-3-(3,6-di-tert-butyl-9H-carbazol-9-yl)-3'-fluoro-5-(2,4,4-trimethylpentan-2-yl)biphenyl-2-ol)-(3'',5''-dichloro-3-(3,6-di-tert-butyl-9H-carbazol-9-yl)-5-(2,4,4-trimethylpentan-2-yl)biphenyl-2-ol)dimethyl-hafnium;
(2',2''-(propane-1,3-diylbis(oxy))bis(3-(3,6-di-tert-butyl-9H-carbazol-9-yl)-5'-fluoro-3'-trifluoromethyl-5-(2,4,4-trimethylpentan-2-yl)biphenyl-2-ol)dimethyl-hafnium;
(2',2''-(butane-1,4-diylbis(oxy))bis(5'-chloro-3-(3,6-di-tert-butyl-9H-carbazol-9-yl)-3'-methyl-5-(2,4,4-trimethylpentan-2-yl)biphenyl-2-ol)dimethyl-hafnium;
(2',2''-(ethane-1,2-diylbis(oxy))bis(5'-chloro-3-(3,6-di-tert-butyl-9H-carbazol-9-yl)-3'-methyl-5-(2,4,4-trimethylpentan-2-yl)biphenyl-2-ol)dimethyl-hafnium;
(2',2''-(propane-1,3-diylbis(oxy))bis(5-chloro-3-(3,6-di-tert-butyl-9H-carbazol-9-yl)-3'-methyl-5-(2,4,4-trimethylpentan-2-yl)biphenyl-2-ol)dimethyl-zirconium;
(2',2''-(propane-1,3-diylbis(oxy))bis(3-(3,6-di-tert-butyl-9H-carbazol-9-yl)-3',5'-dichloro-5-(2,4,4-trimethylpentan-2-yl)biphenyl-2-ol)dimethyl-titanium; and
(2',2''-(propane-1,3-diylbis(oxy))bis(5'-chloro-3-(3,6-di-tert-butyl-9H-carbazol-9-yl)-3'-methyl-5-(2,4,4-trimethylpentan-2-yl)biphenyl-2-ol)dimethyl-titanium.

According to some embodiments, the Group IV metal-ligand complex may include a cyclopentadienyl procatalyst according to formula (XIV):

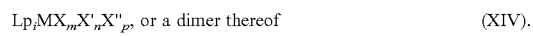

$$Lp_iMX_mX'_nX''_p, \text{ or a dimer thereof} \qquad (XIV).$$

In formula (XIV), Lp is an anionic, delocalized, r-bonded group that is bound to M, containing up to 50 non-hydrogen atoms. In some embodiments of formula (XIV), two Lp groups may be joined together forming a bridged structure, and further optionally one Lp may be bound to X.

In formula (XIV), M is a metal of Group 4 of the Periodic Table of the Elements in the +2, +3 or +4 formal oxidation state. X is an optional, divalent substituent of up to 50 non-hydrogen atoms that together with Lp forms a metallocycle with M. X' is an optional neutral ligand having up to 20 non hydrogen atoms; each X'' is independently a monovalent, anionic moiety having up to 40 non-hydrogen atoms. Optionally, two X'' groups may be covalently bound together forming a divalent dianionic moiety having both valences bound to M, or, optionally two X" groups may be covalently bound together to form a neutral, conjugated or nonconjugated diene that is 7-bonded to M, in which M is in the +2 oxidation state. In other embodiments, one or more X" and one or more X' groups may be bonded together thereby forming a moiety that is both covalently bound to M and coordinated thereto by means of Lewis base functionality. Subscript i of $Lp_i$ is 0, 1, or 2; subscript n of $X'_n$ is 0, 1, 2, or 3; subscript m of $X_m$ is 0 or 1; and subscript p of $X''_p$ is 0, 1, 2, or 3. The sum of i+m+p is equal to the formula oxidation state of M.

Illustrative Group IV metal-ligand complexes may include cyclopentadienyl procatalysts that may be employed in the practice of the present invention include:
cyclopentadienyltitaniumtrimethyl;
cyclopentadienyltitaniumtriethyl;
cyclopentadienyltitaniumtriisopropyl;
cyclopetadienyltitaniumtriphenyl;
cyclopentadienyltitaniumtribenzyl;
cyclopentadienyltitanium-2,4-dimethylpentadienyl;
cyclopentadienyltitanium-2,4-dimethylpentadienyl-triethylphosphine;
cyclopentadienyltitanium-2,4-dimethylpentadienyl-trimethylphosphine;
cyclopentadienyltitaniumdimethylmethoxide;
cyclopentadienyltitaniumdimethylchloride;
pentamethylclopeintadienyltitaniumtrimethyl;
indenyltitaniumtrimethyl;
indenyltitaniumtriethyl;
indenyltitaniumtripropyl;
indenyltitaniumtriphenyl;
tetrahydroindenyltitaniumtribenzyl;
pentamethylcyclopentadienyltitaniumtriisopropyl;
pentamethylcyclopentadienyltitaniumtribenzyl;
pentamethylcyclopentadienyltitaniumdimethylmethoxide;
pentamethylcyclopentadienyltitaniumdimethylchloride;
bis($\eta^5$-2,4-dimethylpentadienyl)titanium;
bis($\eta^5$-2,4-dimethylpentadienyl) titanium•trimethylphosphine;
bis($\eta^5$-2,4-dimethylpentadienyl)titanium•triethylphosphine;
octahydrofluorenyltitaniumtrimethyl;
tetrahydroindenyltitaniumtrimethyl;
tetrahydrofluorenyltitaniumtrimethyl;
(tert-butylamido)(1,1-dimethyl-2,3,9,10-η-1,4,5,6,7,8-hexahydronaphthalenyl)dimethylsilanetitaniumdimethyl;
(tert-butylamido)(1,1,2,3-tetramethyl-2,3,4,9,10-η-1,4,5,6,7,8-hexahydronaphthalenyl)dimethylsilanetitaniumdimethyl;
(tert-butylamido)(tetramethyl-$\eta^5$-cyclopentadienyl) dimethylsilanetitanium dibenzyl;
(tert-butylamido)(tetramethyl-$\eta^5$-cyclopentadienyl)dimethylsilanetitanium dimethyl;
(tert-butylamido)(tetramethyl-$\eta^5$-cyclopentadienyl)-1,2-ethanediyltitanium dimethyl;
(tert-butylamido)(tetramethyl-$\eta^5$-indenyl)dimethylsilanetitanium dimethyl;
(tert-butylamido)(tetramethyl-$\eta^5$-cyclopentadienyl)dimethylsilanetitanium (III) 2-(dimethylamino)benzyl;
(tert-butylamido)(tetramethyl-$\eta^5$-cyclopentadienyl)dimethylsilanetitanium (III) allyl;
(tert-butylamido)(tetramethyl-$\eta^5$-cyclopentadienyl)dimethylsilanetitanium (II) 2,4-dimethylpentadienyl;
(tert-butylamido)(tetramethyl-$\eta^5$-cyclopentadienyl)dimethylsilanetitanium (II) 1,4-diphenyl-1,3-butadiene;
(tert-butylamido)(tetramethyl-$\eta^5$-cyclopentadienyl)dimethylsilanetitanium (II) 1,3-pentadiene;
(tert-butylamido)(2-methylindenyl)dimethylsilanetitanium (II) 1,4-diphenyl-1,3-butadiene;
(tert-butylamido)(2-methylindenyl)dimethylsilanetitanium (II) 2,4-hexadiene;
(tert-butylamido)(2-methylindenyl)dimethylsilanetitanium (IV) 2,3-dimethyl-1,3-butadiene;
(tert-butylamido)(2-methylindenyl)dimethylsilanetitanium (PV) isoprene;
(tert-butylamido)(2-methylindenyl)dimethylsilanetitanium (V) 1,3-butadiene:
(tert-butylamido)(2,3-dimethylindenyl)dimethylsilanetitanium (IV) 2,3-dimethyl-1,3-butadiene;
(tert-butylamido)(2,3-dimethylindenyl)dimethylsilanetitanium (IV) isoprene;
(tert-butylamido)(2,3-dimethylindenyl)dimethylsilanetitanium (IV) dimethyl;
(tert-butylamido)(2,3-dimethylindenyl)dimethylsilanetitanium (IV) dibenzyl;
(tert-butylamido)(2,3-dimethylindenyl)dimethylsilanetitanium (IV) 1,3-butadiene;
(tert-butylamido)(2,3-dimethylindenyl)dimethylsilanetitanium (II) 1,3-pentadiene;
(tert-butylamido)(2,3-dimethylindenyl)dimethylsilanetitanium (II) 1,4-diphenyl-1,3-butadiene;
(tert-butylamido)(2-methylindenyl)dimethylsilanetitanium (II) 1,3-pentadiene;
(tert-butylamido)(2-methylindenyl)dimethylsilanetitanium (IV) dimethyl;
(tert-butylamido)(2-methylindenyl)dimethylsilanetitanium (IV) dibenzyl;
(tert-butylamido)(2-methyl-4-phenylindenyl)dimethylsilanetitanium (I) 1,4-diphenyl-1,3-butadiene;
(tert-butylamido)(2-methyl-4-phenylindenyl)dimethylsilanetitanium (II) 1,3-pentadiene;
(tert-butylamido)(2-methyl-4-phenylindenyl)dimethylsilanetitanium (II) 2,4-hexadiene;
(tert-butylamido)(tetramethyl-$\eta^5$-cyclopentadienyl)dimethyl-silanetitanium (IV) 1,3-butadiene;
(tert-butylamido)(tetramethyl-$\eta^5$-cyclopentadienyl)dimethylsilanetitanium (IV) 2,3-dimethyl-1,3-butadiene:
(tert-butylamido)(tetramethyl-$\eta^5$-cyclopentadienyl)dimethylsilanetitanium (IV) isoprene;
(tert-butylamido)(tetramethyl-$\eta^5$-cyclopentadienyl)dimethyl-silanetitanium (II) 1,4-dibenzyl-1,3-butadiene;
(tert-butylamido)(tetramethyl-$\eta^5$-cyclopentadienyl)dimethylsilanetitanium (II) 2,4-hexadiene;
(tert-butylamido)(tetramethyl-$\eta^5$-cyclopentadienyl)dimethyl-silanetitanium (I) 3-methyl-1,3-pentadiene;
(tert-butylamido)(2,4-dimethylpentadien-3-yl)dimethylsilanetitaniumdimethyl;
(tert-butylamido)(6,6-dimethylcyclohexadienyl)dimethylsilanetitaniumdimethyl;
(tert-butylamido)(1,1-dimethyl-2,3,4,9,10-η-1,4,5,6,7,8-hexahydronaphthalen-4-yl)dimethylsilanetitaniumdimethyl;
(tert-butylamido)(1,1,2,3-tetramethyl-2,3,4,9,10-η-1,4,5,6,7,8-hexahydronaphthalen-4-yl)dimethylsilanetitaniumdimethyl;
(tert-butylamido)(tetramethyl-$\eta^5$-cyclopentadienyl methylphenylsilanetitanium (IV) dimethyl;
(tert-butylamido)(tetramethyl-$\eta^5$-cyclopentadienyl methylphenylsilanetitanium (II) 1,4-diphenyl-1,3-butadiene;
1-(tert-butylamido)-2-(tetramethyl-$\eta^5$-cyclopentadienyl) ethanediyltitanium (IV) dimethyl;
1-(tert-butylamido)-2-(tetramethyl-$\eta^5$-cyclopentadienyl) ethanediyl-titanium (III) 1,4-diphenyl-1,3-butadiene:

Each of the illustrative cyclopentadienyl procatalyst may include zirconium or hafnium in place of the titanium metal centers of the cyclopentadienyl procatalyst.

Other catalysts, especially catalysts containing other Group V metal-ligand complexes, will be apparent to those skilled in the art.

The catalyst systems of this disclosure may include co-catalysts or activators in addition to the bimetallic activator complex having the anion of formula (I) and a countercation. Such additional co-catalysts may include, for example, tri(hydrocarbyl)aluminum compounds having from 1 to 10 carbons in each hydrocarbyl group, an oligomeric or polymeric alumoxane compound, di(hydrocarbyl)(hydrocarbyloxy)aluminums compound having from 1 to 20 carbons in each hydrocarbyl or hydrocarbyloxy group, or mixtures of the foregoing compounds. These aluminum compounds are usefully employed for their beneficial ability to scavenge impurities such as oxygen, water, and aldehydes from the polymerization mixture.

The di(hydrocarbyl)(hydrocarbyloxy)aluminum compounds that may be used in conjunction with the activators described in this disclosure correspond to the formula $T^1{}_2AlOT^2$ or $T^1{}_1Al(T^2)_2$ wherein $T^1$ is a secondary or tertiary $(C_1-C_6)$alkyl, such as isopropyl, isobutyl or tert-butyl; and $T^2$ is a alkyl substituted $(C_6-C_{30})$aryl radical or aryl substituted $(C_1-C_{30})$alkyl radical, such as 2,6-di(tert-butyl)-4-methylphenyl, 2,6-di(tert-butyl)-4-methylphenyl, 2,6-di(tert-butyl)-4-methyltolyl, or 4-(3',5'-di-tert-butyltolyl)-2,6-di-tert-butylphenyl.

Additional examples of aluminum compounds include $[C_6]$trialkyl aluminum compounds, especially those wherein the alkyl groups are ethyl, propyl, isopropyl, n-butyl, isobutyl, pentyl, neopentyl, or isopentyl, dialkyl(aryloxy) aluminum compounds containing from 1-6 carbons in the alkyl group and from 6 to 18 carbons in the aryl group (especially (3,5-di(t-butyl)-4-methylphenoxy)diisobutylaluminum), methylalumoxane, modified methylalumoxane and diisobutylalumoxane.

In the catalyst systems according to embodiments of this disclosure, the molar ratio of the bimetallic activator complex to Group IV metal-ligand complex may be from 1:10,000 to 1000:1, such as, for example, from 1:5000 to 100:1, from 1:100 to 100:1 from 1:10 to 10:1, from 1:5 to 1:1, or from 1.25:1 to 1:1. The catalyst systems may include combinations of one or more bimetallic activator complex described in this disclosure.

Polyolefins

The catalytic systems described in the preceding paragraphs are utilized in the polymerization of olefins, primarily ethylene and propylene. In some embodiments, there is only a single type of olefin or α-olefin in the polymerization scheme, creating a homopolymer. However, additional α-olefins may be incorporated into the polymerization procedure. The additional α-olefin co-monomers typically have no more than 20 carbon atoms. For example, the α-olefin co-monomers may have 3 to 10 carbon atoms or 3 to 8 carbon atoms. Exemplary α-olefin co-monomers include, but are not limited to, propylene, 1-butene, 1-pentene, 1-hexene, 1-heptene, 1-octene, 1-nonene, 1-decene, 4-methyl-1-pentene, 5-ethylidene-2-norbornene, and 5-vinyl-2-norbornene. For example, the one or more α-olefin co-monomers may be selected from the group consisting of propylene, 1-butene, 1-hexene, and 1-octene; or in the alternative, from the group consisting of 1-hexene and 1-octene.

The ethylene-based polymers, for example homopolymers and/or interpolymers (including copolymers) of ethylene and optionally one or more co-monomers such as α-olefins, may comprise from at least 50 mole percent (mol %) monomer units derived from ethylene. All individual values and subranges encompassed by "from at least 50 mol %" are disclosed herein as separate embodiments; for example, the ethylene-based polymers, homopolymers and/or interpolymers (including copolymers) of ethylene and optionally one or more co-monomers such as α-olefins may comprise at least 60 mol % monomer units derived from ethylene; at least 70 mol % monomer units derived from ethylene; at least 80 mol % monomer units derived from ethylene; or from 50 to 100 mol % monomer units derived from ethylene; or from 80 to 100 mol % units derived from ethylene.

In some embodiments, the ethylene-based polymers may comprise at least 90 mole percent units derived from ethylene. All individual values and subranges from at least 90 mole percent are included herein and disclosed herein as separate embodiments. For example, the ethylene-based polymers may comprise at least 93 mole percent units derived from ethylene; at least 96 mole percent units; at least 97 mole percent units derived from ethylene; or in the alternative, from 90 to 100 mole percent units derived from ethylene; from 90 to 99.5 mole percent units derived from ethylene; or from 97 to 99.5 mole percent units derived from ethylene.

In some embodiments of the ethylene-based polymer, the amount of additional α-olefin is less than 50%; other embodiments include at least 0.5 mol % to 25 mol %; and in further embodiments the amount of additional α-olefin includes at least 5 mol % to 10 mol %. In some embodiments, the additional α-olefin is 1-octene.

Any conventional polymerization processes may be employed to produce the ethylene-based polymers. Such conventional polymerization processes include, but are not limited to, solution polymerization processes, gas-phase polymerization processes, slurry-phase polymerization processes, and combinations thereof using one or more conventional reactors such as loop reactors, isothermal reactors, fluidized-bed gas-phase reactors, stirred-tank reactors, batch reactors in parallel, series, or any combinations thereof, for example.

In one embodiment, the ethylene-based polymer may be produced via solution polymerization in a dual reactor system, for example a dual-loop reactor system, wherein ethylene and optionally one or more α-olefins are polymerized in the presence of the catalyst system, as described herein, and optionally one or more co-catalysts. In another embodiment, the ethylene-based polymer may be produced via solution polymerization in a dual reactor system, for example a dual-loop reactor system, wherein ethylene and optionally one or more α-olefins are polymerized in the presence of the catalyst system in this disclosure, and as described herein, and optionally one or more other catalysts. The catalyst system, as described herein, can be used in the first reactor, or second reactor, optionally in combination with one or more other catalysts. In one embodiment, the ethylene-based polymer may be produced via solution polymerization in a dual reactor system, for example a dual-loop reactor system, wherein ethylene and optionally one or more α-olefins are polymerized in the presence of the catalyst system, as described herein, in both reactors.

In another embodiment, the ethylene-based polymer may be produced via solution polymerization in a single reactor system, for example a single-loop reactor system, in which ethylene and optionally one or more α-olefins are polymerized in the presence of the catalyst system, as described within this disclosure, and optionally one or more co-catalysts, as described in the preceding paragraphs.

The ethylene-based polymers may further comprise one or more additives. Such additives include, but are not limited to, antistatic agents, color enhancers, dyes, lubricants, pigments, primary antioxidants, secondary antioxidants, processing aids, UV stabilizers, and combinations thereof. The ethylene-based polymers may contain any amounts of additives. The ethylene-based polymers may comprise from about 0 to about 10 percent by weight of the total amount of such additives, based on the weight of the ethylene-based polymers and the one or more additives. The ethylene-based polymers may further comprise fillers, which may include, but are not limited to, organic or inorganic fillers. The ethylene-based polymers may contain from about 0 to about 20 weight percent fillers such as, for example, calcium carbonate, talc, or $Mg(OH)_2$, based on the combined weight of the ethylene-based polymers and all additives or fillers. The ethylene-based polymers may further be blended with one or more polymers to form a blend.

In some embodiments, a polymerization process for producing an ethylene-based polymer may include polymerizing ethylene and at least one additional α-olefin in the presence of a catalyst system, wherein the catalyst system incorporates at least one metal-ligand complex and at least one bimetallic activator and, optionally a scavenger. The polymer resulting from such a catalyst system that incorporates the metal-ligand complex and the co-catalyst may have a density according to ASTM D792 (incorporated herein by reference in its entirety) from 0.850 $g/cm^3$ to 0.950 $g/cm^3$, from 0.870 $g/cm^3$ to 0.920 $g/cm^3$, from 0.870 $g/cm^3$ to 0.910 $g/cm^3$, or from 0.870 $g/cm^3$ to 0.900 $g/cm^3$, for example.

In another embodiment, the polymer resulting from the catalyst system that includes the metal-ligand complex and the bimetallic activator having an anion of formula (I) has a melt flow ratio ($I_{10}/I_2$) from 5 to 15, in which melt index $I_2$ is measured according to ASTM D1238 (incorporated herein by reference in its entirety) at 190° C. and 2.16 kg load, and melt index $I_{10}$ is measured according to ASTM D1238 at 190° C. and 10 kg load. In other embodiments the melt flow ratio ($I_{10}/I_2$) is from 5 to 10, and in others, the melt flow ratio is from 5 to 9.

In some embodiments, the polymer resulting from the catalyst system that includes the metal-ligand complex has a molecular-weight distribution (MWD) from 1 to 25, where MWD is defined as $M_w/M_n$ with $M_w$ being a weight-average molecular weight and $M_n$ being a number-average molecular weight. In other embodiments, the polymers resulting from the catalyst system have a MWD from 1 to 6. Another embodiment includes a MWD from 1 to 3; and other embodiments include MWD from 1.5 to 2.5.

Embodiments of the catalyst systems described in this disclosure yield unique polymer properties as a result of the high molecular weights of the polymers formed and the amount of the co-monomers incorporated into the polymers.

Batch Reactor Procedure

Batch reactor experiments were performed in a 1-gallon continuous stirred tank reactor. The reactor was loaded with Isopar-E hydrocarbon solvents, hydrogen, and the appropriate amount of octene comonomer before being heated to the specified temperature and pressurized with ethylene to 450 psi. When the reactor was at pressure the polymerization was initiated by adding an activated catalyst solution comprising the procatalyst, bimetallic activator complex, solvent, and triethylaluminum scavenger. Polymerization was allowed to proceed for 10 minutes while maintaining reactor temperature and pressure. After the reaction was completed the polymer was collected and dried in a vacuum oven overnight before being analyzed.

Polyoctene Screening Procedure

Neat 1-octene (11 mL) was added to a 40 mL-vial equipped with a stir bar. The vial was placed in a polyurethane insulating block that itself was placed on a magnetic stir plate. The activator was added to the stirring solution. A solution of the catalyst was then added. The vial was immediately capped with a septum screw-cap lid and a thermometer probe was inserted into the vial such that the probe tip was submerged in the 1-octene solution. The thermometer probe was connected to a digital recorder to record the time and temperature at 5-second intervals. The vial was allowed to continue stirring and was monitored for 10 minutes.

EXAMPLES

Examples 1 to 8 are synthetic procedures for intermediates of activators and for activators themselves. One or more features of the present disclosure are illustrated in view of the examples as follows:

Example 1—Synthesis of [($^tBu^FO)_3$Al(pentafluorobenzoate)Al($O^tBu^F)_3$]$^-$[Me(H)N(octyl)$_2$]$^+$ (Activator A)

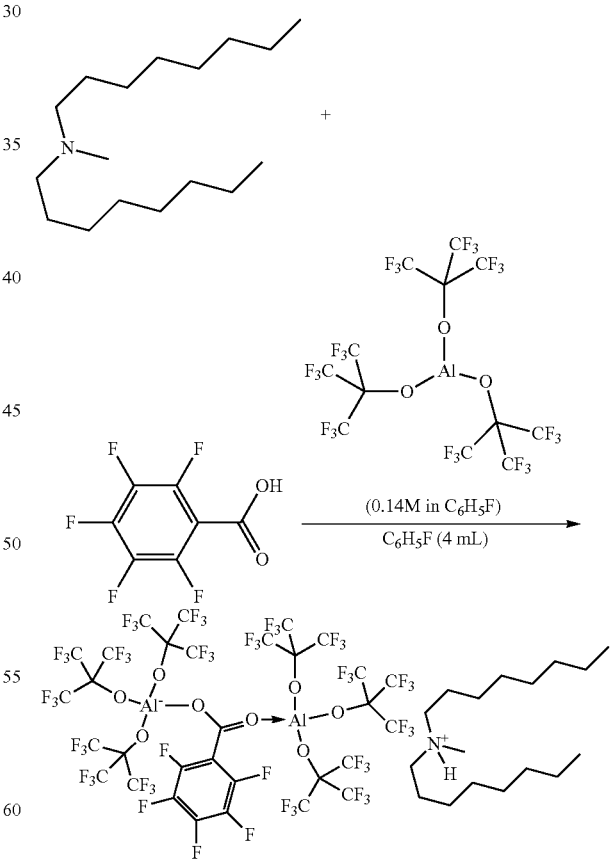

An oven-dried vial was charged with N-methyldioctylamine (33 mg, 0.13 mmol), fluorobenzene (1 mL), and a stir bar. The solution was then treated with pentafluorobenzoic acid (28 mg, 0.13 mmol) and was stirred for 20 min. The resulting solution was then placed in the glove box freezer (−35° C.) for 20 min. A second vial was charged with a solution of Al(O'Bu$^F$)$_3$ (1.9 mL, 0.26 mmol) and a stir bar and was then placed in the freezer for 20 min. Once both solutions were cooled, the benzoic acid/amine solution was slowly added to Al(O'Bu$^F$)$_3$, and allowed to stir in the glovebox freezer for 1 hr. The volatiles were removed under vacuum and the resulting oil was used as is in subsequent reactions (230 mg, 92%).

$^1$H NMR (400 MHz, Methylene Chloride-d$_2$) δ 5.30-4.89 (m, 1H), 3.27 (m, 2H), 3.14 (ddt, J=12.6, 10.3, 6.1 Hz, 2H), 2.99 (d, J=5.5 Hz, 3H), 1.77 (m, 3H), 1.50-1.22 (m, 22H), 0.97-0.83 (m, 6H). $^{27}$Al NMR (104 MHz, Methylene Chloride-d$_2$) δ 39.12. $^{13}$C NMR (101 MHz, Methylene Chloride-d$_2$) δ 166.41, 145.54-145.10 (m), 142.92-142.50 (m), 140.08-139.45 (m), 137.62-136.84 (m), 128.71-128.00 (m), 121.37 (q, J=291.4 Hz), 79.92-77.79 (m), 59.17, 42.24, 32.00, 29.28 (d, J=2.9 Hz), 26.49, 25.26, 22.97, 14.06.

Example 2—Synthesis of ['Bu$^F$O)$_3$Al(pentafluorobenzoate)Al(O'Bu$^F$)$_3$]$^-$[Armenium]$^+$ (Activator B)

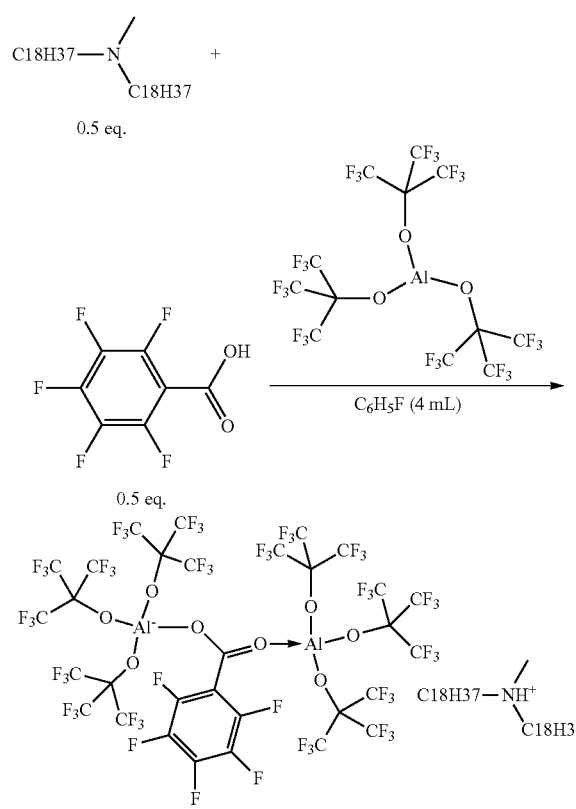

An oven-dried vial was charged with Armeen M2HT (113 mg, 0.21 mmol), fluorobenzene (1 mL), and a stir bar. The solution was then treated with pentafluorobenzoic acid (PFBA) (45 mg, 0.21 mmol) and was stirred for 20 min. The resulting solution was then placed in the glove box freezer (−35° C.) for 20 min. A second vial was charged with a solution of Al(O'Bu$^F$)$_3$ (3 mL, 0.42 mmol) and a stir bar and was then placed in the freezer for 20 min. Once both solutions were cooled, the benzoic acid/Armeen solution was slowly added to Al(O'Bu$^F$)$_3$ and allowed to stir in the glovebox freezer for 1 hr. An aliquot was analyzed by NMR spectroscopy, confirming complete conversion. The volatiles were removed under vacuum and the resulting oil was used as is in subsequent reactions.

$^{19}$F NMR (376 MHz, Benzene-d$_6$) δ −75.44, −139.84, −148.40 (ddd, J=20.5, 16.2, 4.3 Hz), −160.30−−160.82 (m).

Example 3—Synthesis of ['Bu$^F$O)$_3$Al(μ-OH)Al(O'-Bu$^F$)$_3$]$^-$[Ph$_3$C]$^+$ (Activator C)

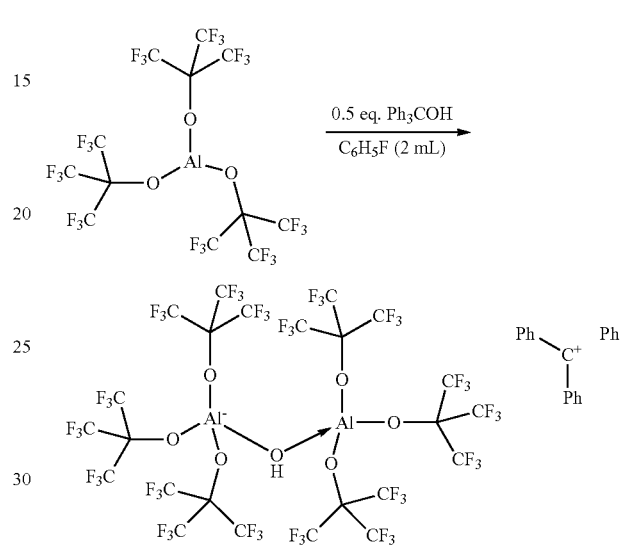

An oven-dried vial was charged with Al(OC(CF$_3$)$_3$)$_3$ (1 mL, 0.14 mmol, 0.14 M in C$_6$H$_5$F), and a stir bar. The solution was placed in the glove box freezer (−35° C.) for 20 min. While stirring, the solution was treated with Ph$_3$COH (18 mg, 0.07 mmol) and allowed to stir overnight in the freezer. The solution was dried under vacuum, and the resulting solid was washed with pentane several times yielding 103 mg, an 85% yield of a solid.

$^1$H NMR (400 MHz, Methylene Chloride-d$_2$) δ 7.89 (broad s, 15H), 2.90 (s, 1H). $^{19}$F NMR (376 MHz, Methylene Chloride-d$_2$) δ −75.57. $^{27}$Al NMR (104 MHz, Methylene Chloride-d$_2$) δ 40.14.

Example 4—Synthesis of [Al(OC(CF$_3$)$_3$)$_3$(acetate)Al(O(C(CF$_3$)$_3$)$_3$]$^-$[Ph$_3$C]$^+$ (Precursor to Activator D)

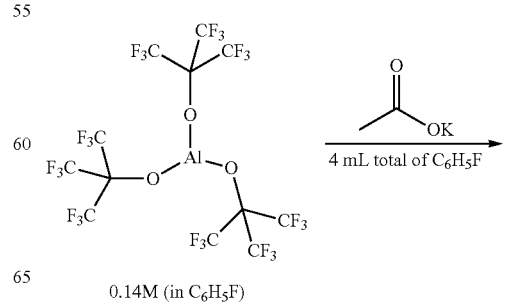

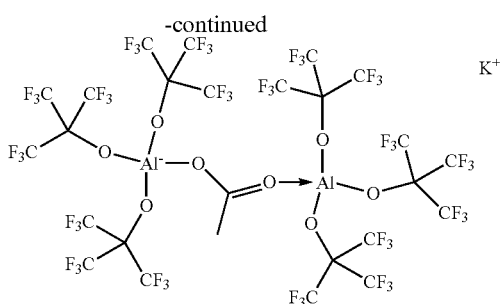

In a nitrogen glovebox, an oven-dried vial was charged with a solution of Al(O$^t$Bu$^F$)$_3$ (0.66 mL, 0.092 mmol, 0.14 M in C$_6$H$_5$F), and a stir bar. The resulting solution was treated with potassium acetate (5 mg, 0.046 mmol) and allowed to stir overnight at room temperature. The volatiles were removed under vacuum, and the resulting sticky oil was triturated with pentane and decanted three times, producing a white powder, which was dried under vacuum (Yield: 70 mg, 97%). H NMR (400 MHz, Methylene Chloride-d$_2$) δ 2.33 (s, 1H). $^{19}$F NMR (376 MHz, Benzene-d$_6$) δ −75.16. $^{27}$Al NMR (104 MHz, Benzene-d$_6$) δ 38.83.

Example 5—Synthesis of [Al(OC(CF$_3$)$_3$)$_3$(acetate)Al(O(C(CF$_3$)$_3$)$_3$]$^-$[Ph$_3$C]$^+$ (Activator D)

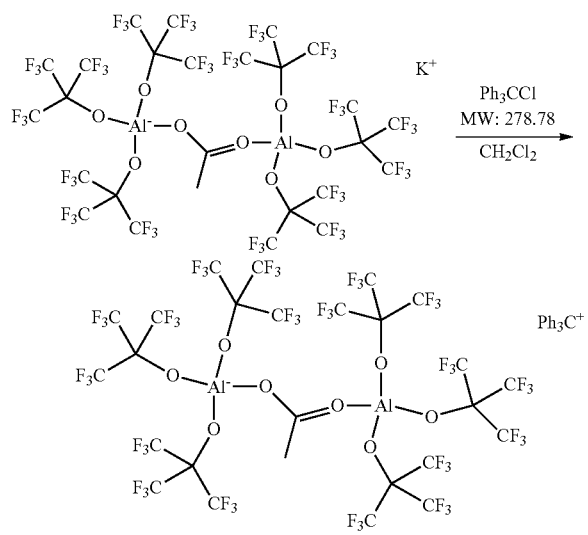

In a nitrogen glovebox, an oven-dried vial was charged with [($^t$Bu$^F$O)$_3$Al(acetate)Al(O$^t$Bu$^F$)$_3$]$^-$[K]$^+$ (60 mg, 0.0384 mmol), CH$_2$Cl$_2$ (2 mL), and a stir bar. The solution was slowly treated with trityl chloride (11 mg, 0.0384 mmol) and then placed in the freezer (−35° C.) and stirred for 1 hr. The solution was taken out of the freezer and stirred for an additional 1 hr at room temperature. The solution was filtered through a plug of Celite and the volatiles were removed under vacuum. The resulting solid was washed with pentane and decanted three times, and then dried under vacuum (52 mg, 77%). $^1$H NMR (400 MHz, Methylene Chloride-d$_2$) δ 8.30 (t, J=7.6 Hz, 3H), 7.96-7.85 (m, 6H), 7.68 (d, J=7.4 Hz, 6H), 2.32 (s, 3H). $^{19}$F NMR (376 MHz, Methylene Chloride-d$_2$) δ −75.95.

Example 6—Synthesis of Al(OC(CF$_3$)$_3$)$_3$ (2-undecylimidazolide)Al(O$^t$Bu$^F$)$_3$]$^-$[Na]$^+$ (Precursor to Activator E)

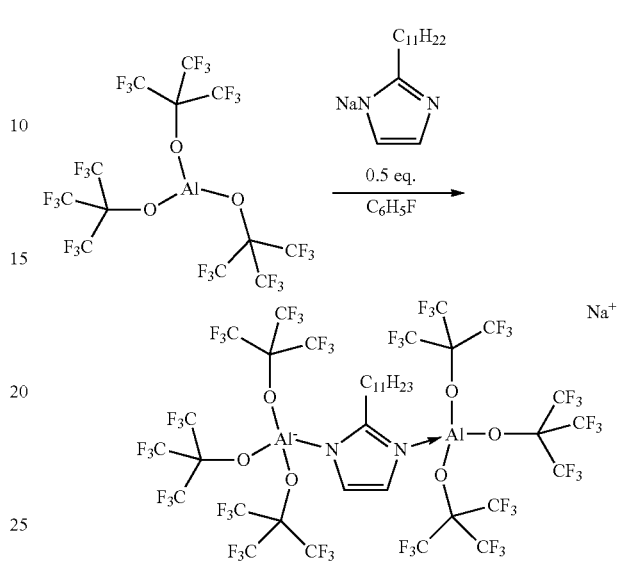

In a nitrogen glovebox, an oven-dried vial was charged with sodium 2-undecylimidazolide (54.6 mg, 0.224 mmol, 1 equiv.). A solution of Al(OC(CF$_3$)$_3$)$_3$ (3.0 mL, 0.447 mmol, 0.149 M in fluorobenzene, 2 equiv.) was removed from a −30° C. freezer, stirred until homogeneous, and added to the imidazolide. The reaction was stirred for 1 h, warming to room temperature. Within the first few minutes, the reaction became homogeneous. Hexane (15 mL) was layered onto the solution and it was allowed to sit at room temperature for 18 h. The vial was shaken and stored in a −30° C. freezer for 6 h, however still no solid precipitated. All volatiles were removed under reduced pressure, yielding a white solid. The solid was triturated with hexane (5 mL) and dried under reduced pressure (this process was repeated for a total of two times) to yield a white solid (386.1 mg, quantitative yield). $^1$H NMR (400 MHz, THF-d$_8$) δ 7.09 (s, 2H), 3.01 (t, J=7.8 Hz, 2H), 1.53-1.41 (m, 2H), 1.33-1.13 (m, 14H), 1.12-1.01 (m, 2H), 0.86 (t, J=6.8 Hz, 3H). $^1$C NMR (101 MHz, THF-d) δ 159.40, 124.59, 120.93 (d, J$_{C-F}$=292.7 Hz), 31.78, 30.47, 29.51, 29.43, 29.41, 29.24, 29.16, 27.44, 26.99, 22.47, 13.32. $^{19}$F NMR (376 MHz, THF-d$_8$) δ −75.51. $^{27}$Al NMR (104 MHz, THF-d$_8$) δ 41.94 (v$_{1/2}$=175 Hz). HRMS (ESI) Calculated for C$_{38}$H$_{25}$Al$_2$F$_{54}$N$_2$O$_6$ [M$^-$] 1685.0487; found 1685.057.

Example 7—Synthesis of [Al(OC(CF$_3$)$_3$)$_3$(2-undecylimidazolide) Al(OC(CF$_3$)$_3$)$_3$]$^-$[Armeenium]$^+$ (Activator E)

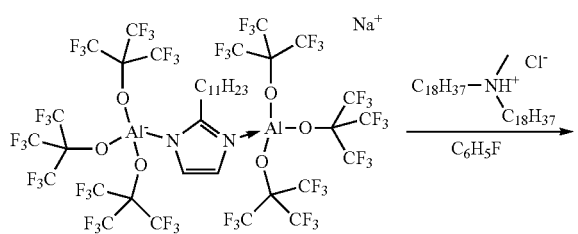

33
-continued

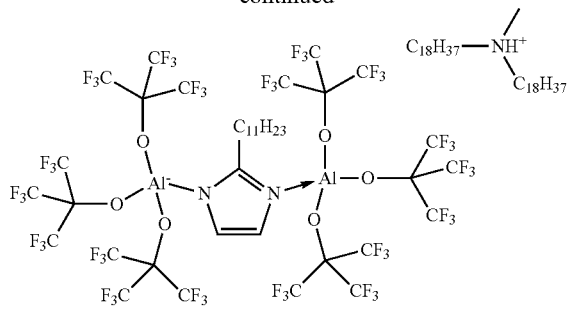

In a nitrogen glovebox, an oven-dried vial was charged with sodium [Al(OC(CF$_3$)$_3$)$_3$]$_2$[2-undecylimidizolide] (276.3 mg, 0.162 mmol, 1 equiv.), Armeenium M2HT HCl salt (92.6 mg, 0.162 mmol, 1 equiv.), and toluene (7 mL). The reaction was stirred at room temperature for 2 h. A fine precipitate formed. The solution was passed through a 0.45-μm syringe filter in line with a 0.2-μm syringe filter. The filter was washed three times with 1 mL of toluene. The combined filtrates were concentrated under reduced pressure to yield a clear oil (341.1 mg, 95% yield).

$^1$H NMR (500 MHz, Toluene-d8) δ 7.50 (s, 2H), 3.47 (t, J=7.7 Hz, 2H), 1.93-1.87 (m, 2H), 1.82 (t, J=8.4 Hz, 4H), 1.51 (s, 3H), 1.48-1.13 (m, 73H), 1.03-0.80 (m, 16H). $^1$C NMR (101 MHz, Toluene-d8) δ 160.00, 125.00, 121.38 (d, J=292.4 Hz), 80.63-77.45 (m), 56.28, 39.68, 31.97, 31.94, 30.90, 29.89, 29.82, 29.80, 29.78, 29.76, 29.70, 29.67, 29.64, 29.55, 29.48, 29.46, 29.38, 29.26, 28.81, 27.82, 27.44, 25.84, 23.70, 22.70, 22.68, 13.81. $^{19}$F NMR (470 MHz, Toluene-d8) δ -74.68. $^{27}$Al NMR (130 MHz, Toluene-d8) δ 42.48. (v$_{1/2}$=285 Hz). HRMS (ESI) Calculated for C37H78N [M+] 536.6129, found 536.6116. Calculated for C38H25Al2F54N2O6 [M-] 1685.0487; found 1685.0461.

Example 8—Synthesis of [($^t$Bu$^F$O)$_3$Al(OTf)Al(O$^t$-Bu$^F$)$_3$]$^-$[Ph$_3$C]$^+$ (Activator F)

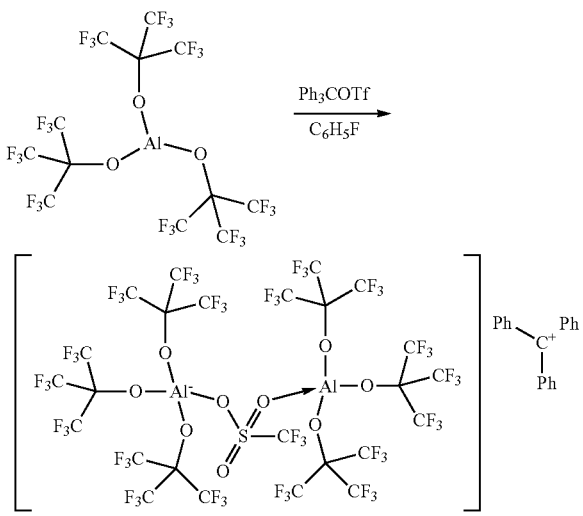

An oven-dried vial was charged with a solution of Al(O$^t$-Bu$^F$)$_3$ (1 mL, 0.14 mmol, 0.14 M) and a stir bar. While stirring, the solution was treated with Ph$_3$COTf (27 mg, 0.07 mmol), producing a clear, yellow solution. The volatiles were removed under vacuum, and the resulting oil was then triturated with pentane and the solvent was decanted then dried under vacuum, producing a yellow powder (98 mg, 75%; purity by 19F NMR: 77%). H NMR (400 MHz, Benzene-d$_6$) δ 7.48 (t, J=7.6 Hz, 3H), 7.10 (t, J=7.7 Hz, 6H), 6.67 (d, J=7.8 Hz, 6H). $^1$F NMR (376 MHz, Benzene-d$_6$) δ -75.10 (s, 3F), -75.96 (s, 54F). $^{27}$Al NMR (104 MHz, Methylene Chloride-d$_2$): not observed.

Example 9—Polymerization Results

The polymerizations were carried out in a batch reactor. The activator efficiency and resulting polymer characteristics were assessed for Activators A-F each anion in the Activators A-F had an anion according to formula (I)—and a catalyst (Catalyst 1) presumed to form from a procatalyst according to the bis((phenylphenoxy) structure of the formula (X).

Procatalyst 1

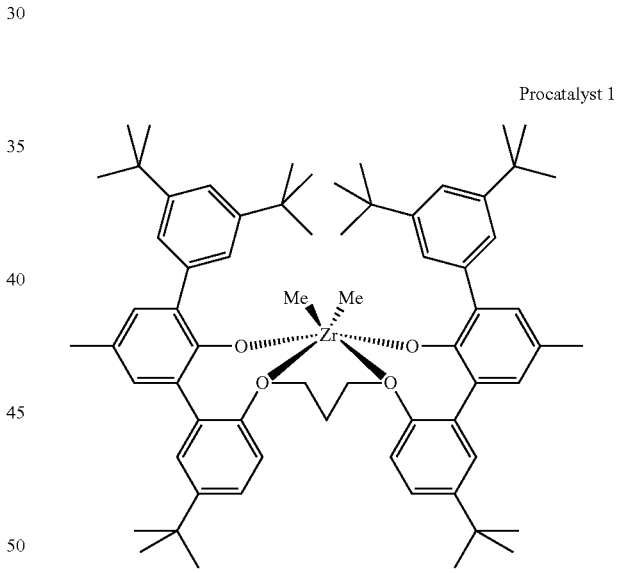

Each of bimetallic Activators A, B, C, D, E, and F and Comparative Activator C1 and Comparative Activator C2 (herein "Comparative C1" and "Comparative C2") were mixed with Procatalyst 1 to form seven catalyst systems. Comparative C$_2$ was modified methylaluminoxane (MMAO-3A). Comparative C1 was a compound having a tetrakis(pentafluorophenyl)borate anion and $^+$NH(Me)(C$_{18}$H$_{37}$)$_2$ as a countercation. The Comparative C1 and Comparative C2 have been successfully used in industrial-scale olefin polymerization reactions.

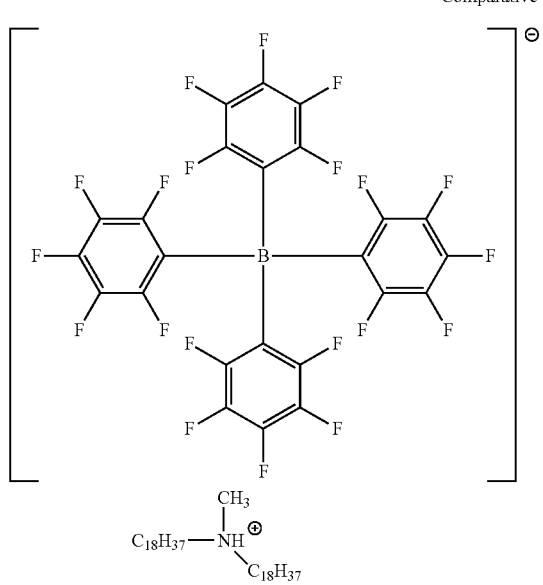

Comparative C1

The efficiencies of the inventive Activators A-E and Comparative C1 and Comparative C2 and the polymer characteristics of the polymers yielded from the inventive Activators A-F and Comparative C1-C2 were determined. The results are summarized in Table 1 and Table 2.

The data in Table 1 were obtained at 140° C. polymerization temperature, and the data in Table 2 were obtained at 190° C.

TABLE 1

Catalyst Efficiencies of Catalyst 1 Activated with Activators at 140° C.

| Activator | Efficiency* | $M_n$ | $M_w$ | PDI |
| --- | --- | --- | --- | --- |
| Comparative C1 | 1,722,680 | 85,591 | 173,696 | 2.03 |
| Comparative C2 | 1,581,318 | 62,630 | 133,754 | 2.14 |
| Activator B | 382,818 | 76,429 | 158,106 | 2.07 |
| Activator C | 964,701 | 88,154 | 194,968 | 2.21 |
| Activator D | 530,444 | 74,362 | 151749 | 2.04 |
| Activator E | 2,654,081 | 74557 | 156454 | 2.10 |
| Activator F | 686,984 | 102,220 | 206,555 | 2.02 |

*Efficiency is defined in units of grams of polymer per gram of active metal (Hf or Zr).

TABLE 2

Catalyst Efficiencies of Catalyst 1 Activated with Activators at 190° C.

| Activator | Efficiency* | $M_n$ | $M_w$ | PDI |
| --- | --- | --- | --- | --- |
| Comparative C1 | 974,445 | 37,591 | 72,012 | 1.92 |
| Activator A | 342,342 | 46,016 | 89,938 | 1.95 |
| Activator B | 1,096,251 | 33,025 | 63,118 | 1.91 |
| Activator C | 730,834 | 43,213 | 84,062 | 1.94 |
| Activator D | 365,417 | 46,016 | 89,938 | 1.95 |
| Activator F | 288,157 | 41,513 | 83,569 | 2.01 |

*Efficiency is defined in units of grams polymer per gram of active metal (Hf or Zr).

Batch reactor conditions for Tables 1 and 2: 1.47 kg of Isopar™ E; 100 grams of octene, 410 psi of ethylene; activator: catalyst ratio was approximately 1.2:1; MMAO-3A was used as an impurity scavenger at a MMAO-3A: procatalyst mole ratio of approximately 50.

TABLE 3

Polyoctene screen Peak Exotherm

| Activator (2.5 µmol) | Catalyst (µmol) | Max Temp. (° C.) |
| --- | --- | --- |
| Comparative C1 | Cat. 1 (2.0) | 96 |
| Activator A | Cat. 1 (2.0) | 120 |
| Activator B | Cat. 1 (2.0) | 100 |
| Activator C | Cat. 1 (2.0) | 94 |
| Activator D | Cat. 1 (2.0) | 40 |

The results in Table 3 indicated that the Activators A, B, C, and D were capable of activating Procatalyst 1 and producing a polyoctene homopolymer. The "Max Temp," in Table 3, was the maximum adiabatic temperature in degrees Celsius in the reactor. Increasing adiabatic temperatures indicated an increasing amount of polymer produced.

TABLE 4

Results from Electrical Experiments Conducted with the Hydrocarbon Conductivity Test

| Activator | Dissipation Factor no water (60 Hz) | Dissipation Factor with water (60 Hz) | Dissipation Factor in solution after heating to 250° C., no water (60 Hz) | Dissipation Factor in solution after heating to 250° C. with water (60 Hz) |
| --- | --- | --- | --- | --- |
| Comparative C1 | 0.16 | — | 0.43 | — |
| Activator E | 0.41 | 0.24 | 1.22 | 0.03 |

The Hydrocarbon Conductivity Test, as described in this disclosure, simulates the post-polymerization process when the produced polymer resins are washed with water to remove the catalyst and co-catalyst residue. The results summarized in Table 4 indicate that the Activator E has a lower dissipation factor than the $B(C_6F_5)_4^-$ anion present in Comparative C1.

Based on the results summarized in Table 4, it is believed that the water interacts with the inventive Activators to reduce the contribution of the Activators to the electrical properties. It is believed, without desiring to be bound by such belief, that the water chemically reacts with the activator to form degradation products that do not significantly contribute to charge transport, thereby causing the polymers produced by the inventive activators to exhibit low conductivity. However, it is believed that Comparative C1 does not react with water under the conditions of the HC Test. Since Comparative C1 consists of ionic species—anions and cations—it contributes to ionic charge transport both before and after water addition.

As previously described, the hydrocarbon solution in the HC Test is heated to remove water. It is believed, without desiring to be bound by such belief, that the water, antioxidant, and/or heat of the water-removal process degrade the inventive activators, resulting in the formation of degradation products that do not significantly contribute to charge transport. It is assumed that Comparative C1 does not significantly degrade under the polymerization conditions, and that, as an ionic species, Comparative C1 contributes to ionic charge transport in the elastomer. Since the inventive activators result in the formation of degradation products that do not significantly contribute to charge transport, the inventive activators are able to produce insulting polymers.

In the FIGURE, the TGIC spectrum for resins generated from activators of the present invention demonstrated that the $B(C_6F_5)_4^-$ anion present in Comparative C1 achieves monomodal composition distributions. This stands in contrast to Comparative C2, which shows a broad, bimodal composition distribution and leads to sticky pellets. The inventive activators achieve monomodal composition distributions similar to Comparative C1. Additionally, the results summarized in Table 4 indicate that Activator E has a better dissipation factor than the $B(C_6F_5)_4$ anion present in Comparative C1.

High Comonomer Content (HCC) Method by TGIC

A commercial Crystallization Elution Fractionation instrument (CEF) (Polymer Char, Spain) was used to perform the high temperature thermal gradient interaction chromatography (TGIC) measurement (Cong, et al., Macromolecules, 2011, 44 (8), 3062-3072). A HYPERCARB column (100×4.6 mm, Part #35005-104646, Thermo Scientific) was used for separation. A "8 cm×0.48 cm (3/16 inch ID)" stainless steel column packed with 27-micron glass beads (Catalog #GL01918/20-27 um, MO-SCI Specialty Products, LLC, Rolla, Mo., USA), was installed in front of the IR detector, in the top oven of the CEF instrument. The experimental parameters are as follows: a top oven/transfer line/needle temperature at 150° C., a dissolution temperature at 160° C., a dissolution stirring setting at 2, a sample loading volume of 0.400 mL, a pump stabilization time of 15 seconds, a pump flow rate of cleaning column at 0.500 mL/m, a pump flow rate of column loading at 0.300 mL/min, a stabilization temperature at 150° C., a stabilization time (pre, prior to load to column) at 3.0 min, a stabilization time (post, after loaded to column) at 1.0 min, a SF (Soluble Fraction) time at 3.0 min, a cooling rate of 3.00° C./min from 150° C. to 30° C., a flow rate during the cooling process of 0.01 mL/min, heating rate of 2.00° C./min from 30° C. to 160° C., an isothermal time at 160° C. for 10 min, an elution flow rate of 0.500 mL/min, and injection loop size of 140 microliters.

Samples were prepared by the PolymerChar autosampler at 160° C., for 60 minutes, at a concentration of 4.0 mg/mL in ODCB. Prior to use, silica gel 40 (particle size 0.2~0.5 mm, catalogue number 10181-3, EMD) was dried in a vacuum oven at 160° C. for about two hours. An amount of 2,5-di-tert-butyl-4-methylphenol (1.6 grams, BHT, catalogue number B1378-500G, Sigma-Aldrich) and silica gel (5.0 grams) were added to two liters of ortho-dichlorobenzene (ODCB, 99% anhydrous grade, Sigma-Aldrich), creating an ODCB solution. The ODCB solution was purged with dried nitrogen ($N_2$) for one hour prior to use.

The TGIC data was processed on a PolymerChar (Spain) "GPC One" software platform. The temperature calibration was performed with a mixture of about 4 to 6 mg of eicosane, 14.0 mg of isotactic homopolymer polypropylene iPP (polydispersity of 3.6 to 4.0, and molecular weight (Mw) reported as polyethylene equivalent of 150,000 to 190,000, and polydispersity (Mw/Mn) of 3.6 to 4.0), and 14.0 mg of homopolymer polyethylene HDPE (zero comonomer content, Mw reported as polyethylene equivalent as 115,000 to 125,000, and polydispersity of 2.5 to 2.8), in a 10-mL vial filled with 7.0 mL of ODCB. The dissolution time was 2 hours at 160° C.

The calibration process (30° C. to 150° C. for eicosane elution and HDPE elution) included the following steps: (1) the eluting temperature was extrapolated for each of the isothermal steps during elution according to heating rate (demonstrated in FIG. 1). (2) The delay volume was calculated, and the temperature (x-axis) was shifted corresponding to the IR measurement channel chromatogram (y-axis), so that the eicosane peak (y-axis) is coincident with elution temperature at 30.0° C. The delay volume is calculated from the temperature difference (30° C.—the actual elution temperature of the eicosane peak) divided by heating rate of the method, and then multiplied by elution flow rate. (3) Each recorded elution temperature was adjusted with this same delay volume adjustment. (4) The heating rate was linearly scaled, so that the HDPE reference has an elution peak temperature of 150.0° C., while maintaining an eicosane elution peak temperature of 30.0° C. Finally, (5) the peak temperature of the polypropylene was observed to be from 119.3 to 120.2° C., which is a validation of the calibration method.

Data Processing for Polymer Samples of TGIC

A solvent blank (pure solvent injection) was run under the same experimental conditions as the polymer samples. Data processing for polymer samples includes: subtraction of the solvent blank for each detector channel, temperature extrapolation, as described in the calibration process, compensation of temperature with the delay volume, determined from the calibration process, and adjustment in elution temperature axis to the 30° C. and 160° C. range, as calculated from the heating rate of the calibration.

The chromatogram was integrated with PolymerChar "GPC One" software. A straight baseline was drawn from the visible difference, when the peak falls to a flat baseline (roughly a zero value in the blank subtracted chromatogram) at high elution temperature and the minimum or flat region of detector signal on the high temperature side of the soluble fraction (SF).

The upper temperature integration limit was established, based on the visible difference when the peak falls to the flat baseline region (roughly a zero value in the blank subtracted chromatogram). The lower temperature integration limit was established, based on the intersection point of baseline with the chromatogram including the soluble fraction.

The "High Comonomer Content (HCC)" is defined as the weight percentage of the material eluting at a temperature less than or equal to 65.0° C. The HCC was calculated by integrating the IR measurement channel, at temperatures less than, and including, 65.0° C., and dividing this value by the total integration of the IR measurement channel.

Equipment Standards

All solvents and reagents are obtained from commercial sources and used as received unless otherwise noted. Anhydrous toluene, hexanes, tetrahydrofuran, and diethyl ether are purified via passage through activated alumina and, in some cases, Q-5 reactant. Solvents used for experiments performed in a nitrogen-filled glovebox are further dried by storage over activated 4 Å molecular sieves. Glassware for moisture-sensitive reactions is dried in an oven overnight prior to use. NMR spectra are recorded on Bruker Avance III HD 400 MHz NMR, Varian 400-MR or VNMRS-500 spectrometers. LC-MS analyses are performed using a Waters e2695 Separations Module coupled with a Waters 2424 ELS detector, a Waters 2998 PDA detector, and a Waters 3100 ESI mass detector. LC-MS separations are performed on an XBridge C18 3.5 μm 2.1×50 mm column using a 5:95 to 100:0 acetonitrile to water gradient with 0.1% formic acid as the ionizing agent. HRMS analyses are performed using an Agilent 1290 Infinity LC with a Zorbax Eclipse Plus C18 1.8 μm 2.1×50 mm column coupled with an Agilent 6230 TOF Mass Spectrometer with electrospray ionization. H NMR data are reported as follows: chemical shift (multiplicity (br=broad, s=singlet, d=doublet, t=triplet, q=quartet, p=pentet, sex=sextet, sept=septet and m=multiplet), integration, and assignment). Chemical shifts for $^1H$ NMR data are reported in ppm downfield from tetramethylsilane (TMS, δ scale) using residual protons in the deuterated solvent as references. $^{13}$C NMR data are determined with $^1$H decoupling, and the chemical shifts are reported downfield from tetramethylsilane (TMS, δ scale) in ppm using residual carbons in the deuterated solvent as references.

The invention claimed is:

1. A process of polymerizing olefins comprising contacting ethylene and a ($C_3$-$C_{40}$)alpha-olefin comonomer in the presence of a catalyst system to produce a polymer resin; the catalyst system comprising a procatalyst and a bimetallic activator complex wherein the bimetallic activator complex comprises an anion and a countercation, the anion having a structure according to formula (I):

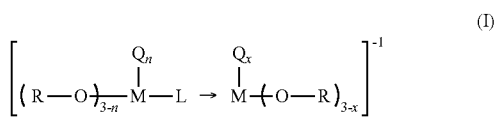

where:
- each M is independently aluminum, boron, or gallium;
- L is chosen from a species having at least two Lewis basic sites;
- each Q is independently a monodentate ligand;
- n is 0, 1, or 2, wherein when n is 0, Q of $Q_n$ is not present;
- x is 0, 1, or 2, wherein when x is 0, Q of $Q_x$ is not present;
- each R is independently selected from the group consisting of radicals having formula (II) and radicals having formula (III):

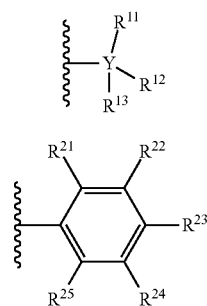

each Y is independently carbon or silicon;
each $R^{11}$, $R^{12}$, $R^{13}$, $R^{21}$, $R^{22}$, $R^{23}$, $R^{24}$, and $R^{25}$, is independently chosen from ($C_1$-$C_{40}$)alkyl, ($C_6$-$C_{40}$)aryl, —H, —$NR^N_2$, —$OR^C$, —$SR^C$, or halogen, wherein when R is a radical according to formula (II), at least one of $R^{11}$, $R^{12}$, or $R^{13}$ is perhalogenated ($C_1$-$C_{40}$)alkyl, perhalogenated ($C_6$-$C_{40}$)aryl, or —F; and when R is a radical according to formula (III), at least one of $R^{21}$, $R^{22}$, $R^{23}$, $R^{24}$, and $R^{25}$ is perhalogenated ($C_1$-$C_{40}$)alkyl, perhalogenated ($C_6$-$C_{40}$)aryl, or —F;
optionally, when n is 0 or 1, two R groups in formula (I) are covalently connected; and
each $R^N$ or $R^C$ is independently ($C_1$-$C_{30}$)hydrocarbyl or —H.

2. The process according to claim 1, wherein L is chosen from ($C_1$-$C_{20}$)heterohydrocarbon anion, $^-OC(O)R^L$, $^-S(O)_3R^L$, $^-P(O)_3R^L$, $^-NR^L_2$, $^-OR^L$, $^-SR^L$, or halide, wherein $R^L$ is —H, ($C_1$-$C_{30}$)hydrocarbyl, halogen-substituted ($C_1$-$C_{30}$)hydrocarbyl.

3. The process according to claim 2, wherein L is $^-OC(O)R^L$ and $R^L$ is —$C_6F_5$.

4. The process according to claim 2, wherein L is $^-OC(O)R^L$ and $R^L$ is —$CH_3$.

5. The process according to claim 1, wherein when each M is aluminum, L is chosen from ($C_1$-$C_{20}$)heterohydrocarbon anion, $^-OC(O)R^L$, $^-S(O)_3R^L$, $^-P(O)_3R^L$, $^-NR^L_2$, $^-OR^L$, or $^-SR^L$, wherein $R^L$ is —H, ($C_1$-$C_{30}$)hydrocarbyl or halogen-substituted ($C_1$-$C_{30}$)hydrocarbyl.

6. The process according to claim 1, wherein L is selected from radicals having the formula (IV):

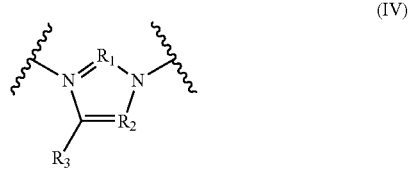

where
each of $R^1$ and $R^2$ are independently selected from —C($R^L$)— or —N—, wherein $R^L$ is —H, ($C_1$-$C_{30}$)hydrocarbyl, or halogen-substituted ($C_1$-$C_{30}$)hydrocarbyl, and $R^3$ is chosen from —H, ($C_1$-$C_{30}$)hydrocarbyl, or halogen-substituted ($C_1$-$C_{30}$)hydrocarbyl.

7. The process according to claim 6, wherein $R^1$ is —C($C_{11}H_{23}$)—, $R_2$ is —C(H)—, and $R^3$ is —H.

8. The process according to claim 1, wherein L is —OS(O)$_2$CF$_3$.

9. The process according to claim 1, wherein each R is a radical having the formula (II), wherein Y is carbon, $R^{11}$, $R^{12}$, and $R^{13}$ are fluorine.

10. The process according to claim 1, wherein the countercation has a formal charge of +1.

11. The polymerization process according to claim 1, wherein the countercation is $^+N(H)R^N_3$, where each $R^N$ is chosen from ($C_1$-$C_{20}$)alkyl or ($C_6$-$C_{20}$)aryl.

12. The polymerization process according to claim 11, wherein the countercation is $^+N(H)R^N_3$, where at least two $R^N$ are chosen from ($C_{10}$-$C_{20}$)alkyl.

13. The polymerization process according to claim 9, wherein the countercation is $^+C((C_6H_5)_3$.

14. The polymerization process according to claim 9, wherein the countercation is $^+C(C_6H_4R^C)_3$, where $R^C$ is ($C_1$-$C_{20}$)alkyl.

15. The polymerization process according to claim 1, wherein the bimetallic activator complex in a high-boiling-point fully saturated hydrocarbon solution having a concentration of 200 micromoles of bimetallic activator complex and 20 millimoles of water per liter of high-boiling-point fully saturated hydrocarbon has a percent dissipation factor of less than or equal to 0.1 as measured by the Hydrocarbon Conductivity Test.

* * * * *